US009805178B2

(12) United States Patent
Jung

(10) Patent No.: US 9,805,178 B2
(45) Date of Patent: *Oct. 31, 2017

(54) PORTABLE TERMINAL AND METHOD OF SETTING AND RELEASING USE RESTRICTION THEREFOR

(71) Applicant: Shi-Eun Jung, Incheon (KR)

(72) Inventor: Shi-Eun Jung, Incheon (KR)

(73) Assignee: Shi-Eun Jung, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/326,352

(22) PCT Filed: Jul. 23, 2015

(86) PCT No.: PCT/KR2015/007677
§ 371 (c)(1),
(2) Date: Jan. 13, 2017

(87) PCT Pub. No.: WO2016/017996
PCT Pub. Date: Feb. 4, 2016

(65) Prior Publication Data
US 2017/0213017 A1  Jul. 27, 2017

(30) Foreign Application Priority Data

Jul. 28, 2014 (KR) .................. 10-2014-0095815
Sep. 15, 2014 (KR) .................. 10-2014-0122271

(51) Int. Cl.
*G06F 21/31* (2013.01)
*G06F 21/83* (2013.01)
*H04W 12/06* (2009.01)

(52) U.S. Cl.
CPC .............. *G06F 21/31* (2013.01); *G06F 21/83* (2013.01); *H04W 12/06* (2013.01)

(58) Field of Classification Search
CPC ....................................................... G06F 21/31
See application file for complete search history.

(56) References Cited

U.S. PATENT DOCUMENTS 8,660,529 B2 *  2/2014  Park .................. G06F 21/73
                                                       455/410
9,329,627 B2 *  5/2016  Hong ................... G06F 1/1626
(Continued)

FOREIGN PATENT DOCUMENTS

KR        10-0829111 B1       5/2008
KR    10-2010-0092154 A       8/2010
(Continued)

OTHER PUBLICATIONS

Uchida; Fingerprint-based user-friendly interface and pocket-PID for mobile authentication; Published in: Pattern Recognition, 2000. Proceedings. 15th International Conference on; Date of Conference: Sep. 3-7, 2000; IEEE Xplore.*

(Continued)

*Primary Examiner* — Bradley Holder
(74) *Attorney, Agent, or Firm* — The PL Law Group, PLLC

(57) ABSTRACT

A portable terminal with a body having a front surface with a display unit and a rear surface including a rear password input unit provided on the rear surface of the body, which is opposite to the display unit, to receive a password for setting or releasing of use restriction, a storage unit that stores the input password for the setting of the use restriction, and a control unit that determines the releasing of the use restriction by comparing the password for the releasing of the use restriction, which is input into the rear password input unit, with the stored password for the setting of the use restriction. The input of the password for the setting or the releasing of the use restriction is prevented from being exposed to other (Continued)

persons, so that the security of the portable terminal is remarkably improved.

4 Claims, 33 Drawing Sheets

(56) References Cited

U.S. PATENT DOCUMENTS

| | | | | |
|---|---|---|---|---|
| 2003/0051138 | A1* | 3/2003 | Maeda | G06F 21/32 |
| | | | | 713/168 |
| 2005/0270140 | A1* | 12/2005 | Oh | G06K 9/6255 |
| | | | | 340/5.83 |
| 2006/0160525 | A1* | 7/2006 | Watanabe | G06Q 20/20 |
| | | | | 455/411 |
| 2007/0057764 | A1* | 3/2007 | Sato | G06K 9/00006 |
| | | | | 340/5.52 |
| 2009/0315846 | A1* | 12/2009 | Kim | G02B 6/0076 |
| | | | | 345/173 |
| 2010/0009658 | A1* | 1/2010 | Wu | H04M 1/673 |
| | | | | 455/411 |
| 2010/0105364 | A1* | 4/2010 | Yang | G06F 17/30663 |
| | | | | 455/414.1 |
| 2011/0058320 | A1* | 3/2011 | Kim | H04M 1/0252 |
| | | | | 361/679.01 |
| 2011/0107226 | A1* | 5/2011 | Heo | H04M 1/72561 |
| | | | | 715/736 |
| 2012/0164978 | A1* | 6/2012 | Conti | G06F 21/32 |
| | | | | 455/411 |
| 2013/0154924 | A1* | 6/2013 | Hong | G06F 1/1626 |
| | | | | 345/157 |
| 2014/0004907 | A1 | 1/2014 | Kim et al. | |
| 2014/0007227 | A1* | 1/2014 | Morinaga | G06F 21/31 |
| | | | | 726/19 |
| 2014/0225821 | A1 | 8/2014 | Kim et al. | |
| 2015/0207920 | A1* | 7/2015 | Choi | G06F 3/0484 |
| | | | | 455/566 |
| 2015/0244848 | A1* | 8/2015 | Park | G06F 3/017 |
| | | | | 455/412.2 |

FOREIGN PATENT DOCUMENTS

| | | |
|---|---|---|
| KR | 10-2011-0100986 A | 9/2011 |
| KR | 10-2012-0038777 A | 4/2012 |
| KR | 10-2014-0037575 A | 3/2014 |
| KR | 10-2014-0062933 A | 5/2014 |
| KR | 10-1397089 B1 | 5/2014 |
| KR | 10-2014-0066676 A | 6/2014 |

OTHER PUBLICATIONS

Patel et al.; A gesture-based authentication scheme for untrusted public terminals; Published in: Proceeding UIST '04 Proceedings of the 17th annual ACM symposium on User interface software and technology; 2004; pp. 157-160; ACM Digital Library.*

International Search Report for PCT/KR2015/007677.

Office action dated Dec. 16, 2014 from Korean Intellectual Property Office in a counterpart Korean Patent Application No. 10-2014-0095815.

Office action dated Apr. 1, 2015 from Korean Intellectual Property Office in a counterpart Korean Patent Application No. 10-2014-0122271.

* cited by examiner

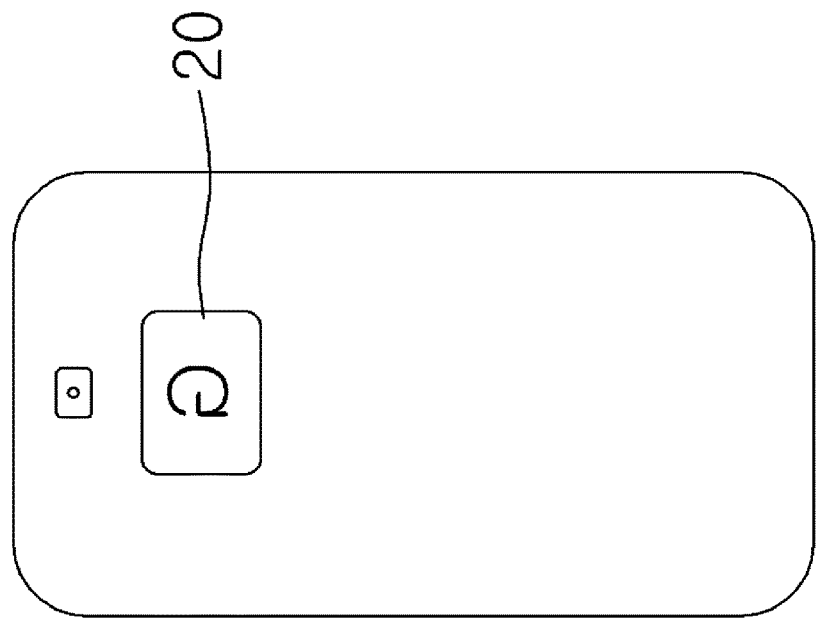
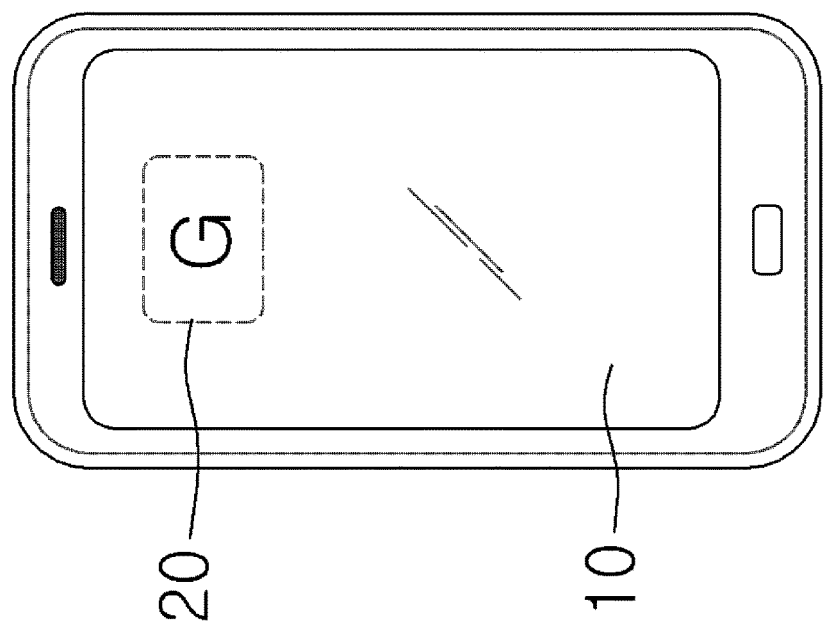

FIG. 9
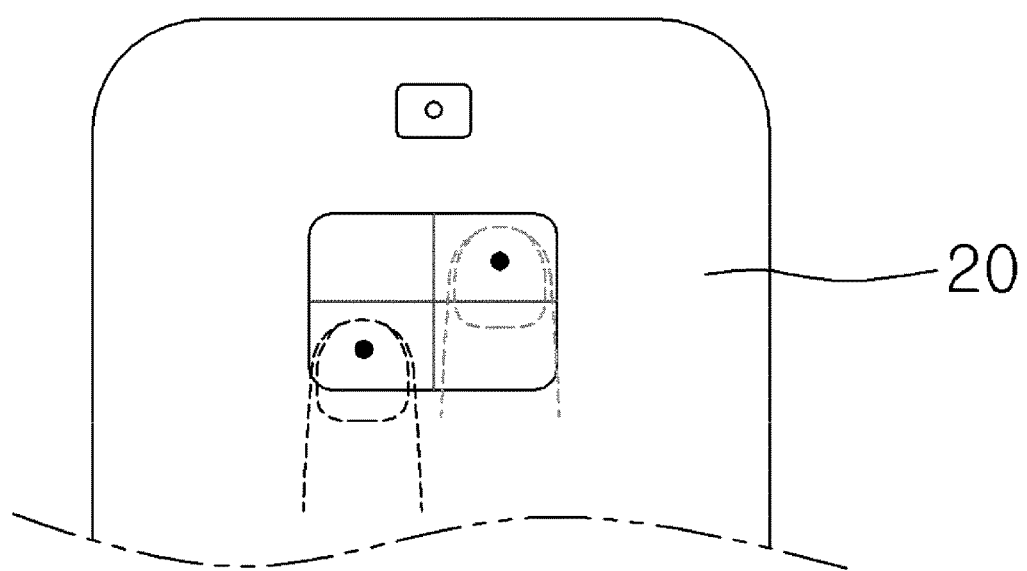
(ex) 

PORTABLE TERMINAL AND METHOD OF SETTING AND RELEASING USE RESTRICTION THEREFOR

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/007677, filed Jul. 23, 2015, which claims priority to the benefit of Korean Patent Application No. 10-2014-0122271 filed in the Korean Intellectual Property Office on Sep. 15, 2014, the entire contents of which are incorporated herein by reference.

TECHNICAL FIELD

The present invention relates to a portable terminal and a method of setting and releasing the use restriction thereof, and more particularly to a portable terminal having enhanced security to prevent a password from being exposed to a person around a user by setting and releasing the use restriction through a rear password input unit provided on a rear surface of a body and a method of setting and releasing the use restriction thereof.

BACKGROUND ART

As mobile communication services have been rapidly developed, and users using the mobile communication services have been exponentially increased, portable terminals have been provided with various functions. For example, the portable terminals have been realized in the form of multimedia devices having multiple functions, such as a video telephony as well as a basic voice call, wireless Internet access, electronic payment, a digital camera function to photograph a still image or a moving picture, MP3 and PMP functions to reproduce music or moving pictures, and a DMB function to receive broadcasting.

Accordingly, the portable terminal has various pieces of information including a still image, a moving picture, a text file, or a text message related to the privacy of a user, which should not be exposed to other persons. Further, the portable terminal has personal information such as an ID, a password, and a certificate for electronic payment.

Accordingly, recently, in a portable terminal such as a smart phone, security for the identify theft prevention and privacy protection for various pieces of personal information stored in the portable terminal is significantly important. As one manner to enhance the security for the portable terminal, a use restriction function by screen locking is used.

If the use restriction function by the screen locking is set in the portable terminal as described above, even if a user loses the portable terminal or is away from a place while leaving the portable terminal, since others cannot activate functions of the portable terminal due to the set use restriction or see the information stored in the portable terminal, various pieces of personal information or important documents stored in the portable terminal can be safely protected.

Representative setting and releasing manners of the use restriction for a portable terminal according to the related art will be described below.

First, a user sets a password by inputting a plurality of secrete numbers through a number inputting display part. Only when numbers matching with the setting password are input, the use of the portable terminal is allowed by releasing the use restriction. The password is generally related to the specific information of the user, such as the birthday, or the phone number of the user, so that others may easily find the password. In addition, the password is usually matched to a password of a bank account, a password for the entrance of a door, or a log-in password for the Internet. Accordingly, when the password leakage occurs, secondary damages may be caused.

Thus, as shown in FIG. 33, a method is mainly used that a portable terminal is enabled to be usable by releasing the use restriction only when a user sets a password by inputting a shape pattern according to a moving locus through a pattern input display part, and a shape pattern matched to the set password is input.

However, in all methods of setting and releasing the use restriction according to the related art, since a password is input through a touch screen provided on the front surface of a main body of a portable terminal, when the user inputs a password or a shape pattern to release the use restriction, the input screen and an inputting behavior of the user cannot help being exposed to others so that security may be vulnerable.

Especially, even when a portable terminal is not used for a while, the portable terminal is immediately in a use restriction mode according to a power saving mode, so that a user should frequently input a password to release the use restriction, Thus, whenever that the user inputs a password into the front touch screen while seeing the front touch screen, others may peep into the input screen and the inputting behavior of the user, so that there may be a great danger to expose the password for usage restriction to others.

Further, since the security is vulnerable, the user should carefully input passwords such as secret numbers or shape patterns or frequently change passwords while paying attention to whether others peep at the passwords when the user inputs the passwords with the concerns about the leakage of the passwords, and when the user frequently changes passwords, he or she may remember the changed new password, making it possible to use the portable terminal.

Meanwhile, in order to solve the danger of leakage of a password, a method of providing the portable terminal provided with a fingerprint recognition section to set or release us restrictions through recognition of a fingerprint has been suggested.

However, since a fingerprint of the user itself is encrypted in the setting/releasing method through the recognition of a fingerprint, the method has an excellent security having no concern about leakage of a password in the everyday life, but in a specific situation, for example, when the user is not clearly conscious, for example, when the user is totally drunken or slept deep or when the user is under pressure, the use restriction for the portable terminal is immediately released as long as the others bring a finger of the user into contact with the finger recognition section stealthily or compulsorily, the method is more vulnerable than the setting/releasing method through secret numbers or pattern passwords.

SUMMARY

The present invention is made in order to solve the problem occurring in the related art, and an object of the present invention is to provide a portable terminal having enhanced security by preventing a password input for the setting and the releasing of use restriction from being exposed to others around a user and a method of setting and releasing the use restriction thereof.

In order to accomplish the above object, there is provided a portable terminal with a body having a front surface with a display unit and a rear surface including a rear password input unit provided on the rear surface of the body, which is opposite to the display unit, to receive a password for setting or releasing of use restriction, a storage unit that stores the input password for the setting of the use restriction, and a control unit that determines the releasing of the use restriction by comparing the password for the releasing of the use restriction, which is input into the rear password input unit, with the stored password for the setting of the use restriction.

In order to accomplish the above object, there is provided a method of setting and releasing use restriction for a portable terminal. The method includes setting the use restriction for the portable terminal including a display unit provided on a front surface of a body thereof and a rear password input unit provided on a rear surface of the body, and releasing the use restriction set for the portable terminal. The setting of the use restriction includes inputting a password for the setting of the use restriction into the rear password input unit; and storing the input setting password. The releasing of the use restriction includes inputting a password for the releasing of the use restriction into the rear password input unit; and determining the releasing of the use restriction by comparing the input releasing password with the setting password stored in the setting of the use restriction.

As described above, according to the present invention, since the password for the setting and the releasing the use restriction is input through a rear password input unit provided on the rear surface of the body of the portable terminal, both of the rear password input unit, which is an input section, and the action of inputting the password by the user are hidden by the body and not exposed to others. Accordingly, the security for the password can be remarkably improved.

In addition, the user can conveniently select and use a section or a direction of inputting a password under various use environments, and set or release the use restriction without errors.

BRIEF DESCRIPTION OF THE DRAWING

FIGS. 7(a) and 7(b) illustrate the inputting of a password set in a specific shape and the views illustrating the front surface and the rear surface, respectively;

FIG. 9 is a view illustrating the inputting of the password to be set in a sequential pattern onto the rear surface;

DETAILED DESCRIPTION

Hereinafter, exemplary embodiments of the present invention will be described in detail with reference to accompanying drawings.

However, in the following description of the embodiments, if detailed description about well-known functions or configurations are obvious to those skilled in the art and considered to unnecessarily make the technical features of the present invention unclear, the detailed description will be omitted.

Portable terminals according to the present invention may include various electronic devices, such as a cellular phone, a smart phone, a tablet PC, a PDA, and a PMP, which can be carried by a user for the use thereof, without the limitations. Hereinafter, the smart phone will be described as one example of the portable terminal for the convenience of explanation.

Figure 1:
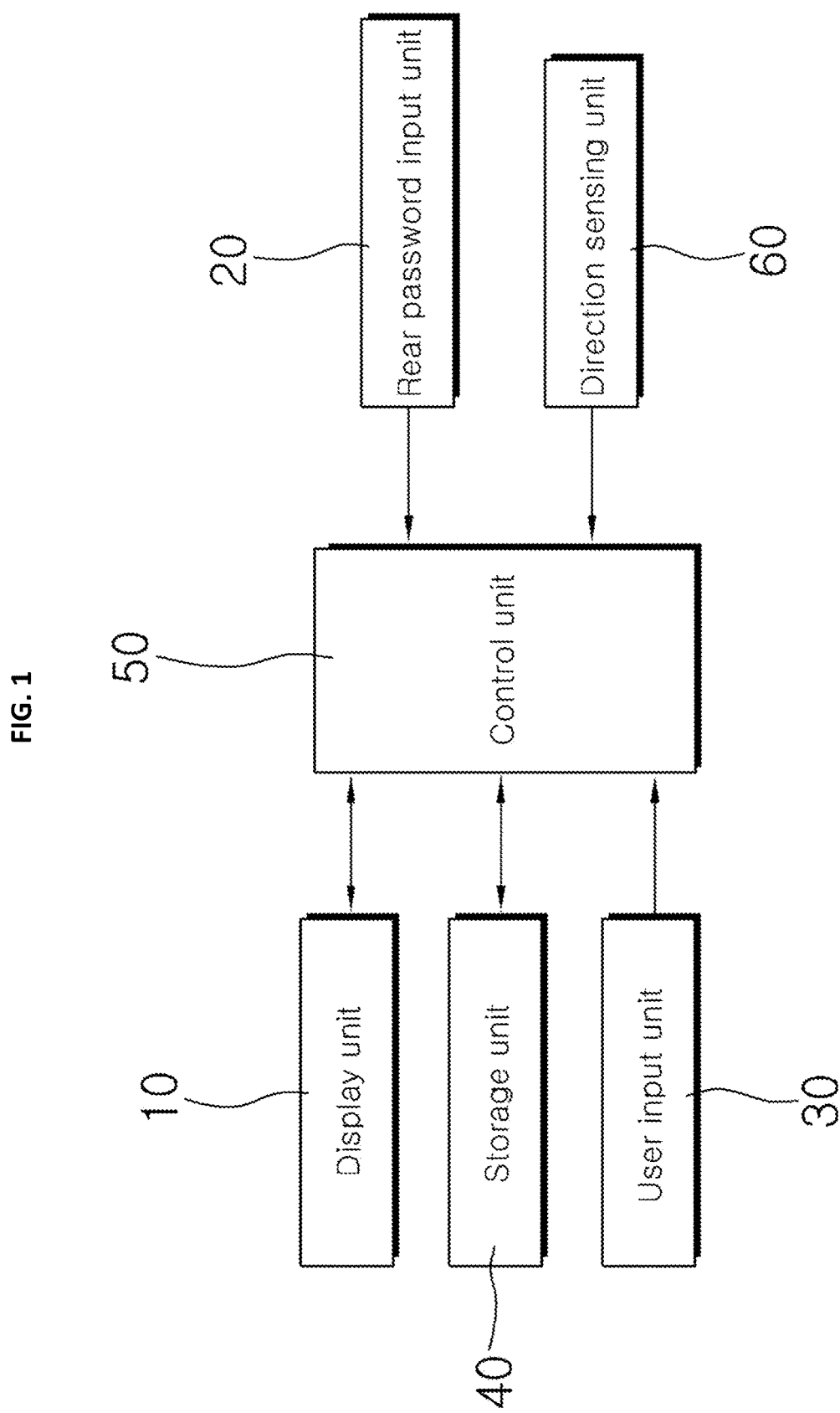
FIG. 1 is a block diagram illustrating a portable terminal according to a first embodiment.

FIG. 1 is a block diagram illustrating a portable terminal according to a first embodiment of the present invention. The portable terminal according to the first embodiment includes a display unit 10, a rear password input unit 20, a user input unit 30, a storage unit 40, and a control unit 50.

Naturally, only components related to the features of the present invention are illustrated, and various components, such as a wireless communication unit, a power supply unit, a photographing section, or a voice inputting/outputting section, may be included herein for the realization of various functions for the portable terminal if necessary. However, since the above components are well-known in the art to which the present invention pertains and are not related to the features of the present invention, the details thereof will be omitted in order to avoid redundancy. Accordingly, only the components related to the features of the present invention will be described in detail below.

The display unit 10 may display various kinds of visible information, and the visible information may be displayed in various shapes including letters, numbers, symbols, graphics, or icons.

The display unit 10 may be realized using various liquid crystal displays such as a plasma display panel (PDP), a liquid crystal display (LCD), a light emitting diode (LED), an organic light emitting diode (OLED), or a flexible display. In addition, the display unit 10 includes a touch screen including a touch panel to function as a touch-based input section as well as an image outputting section.

Figure 3:
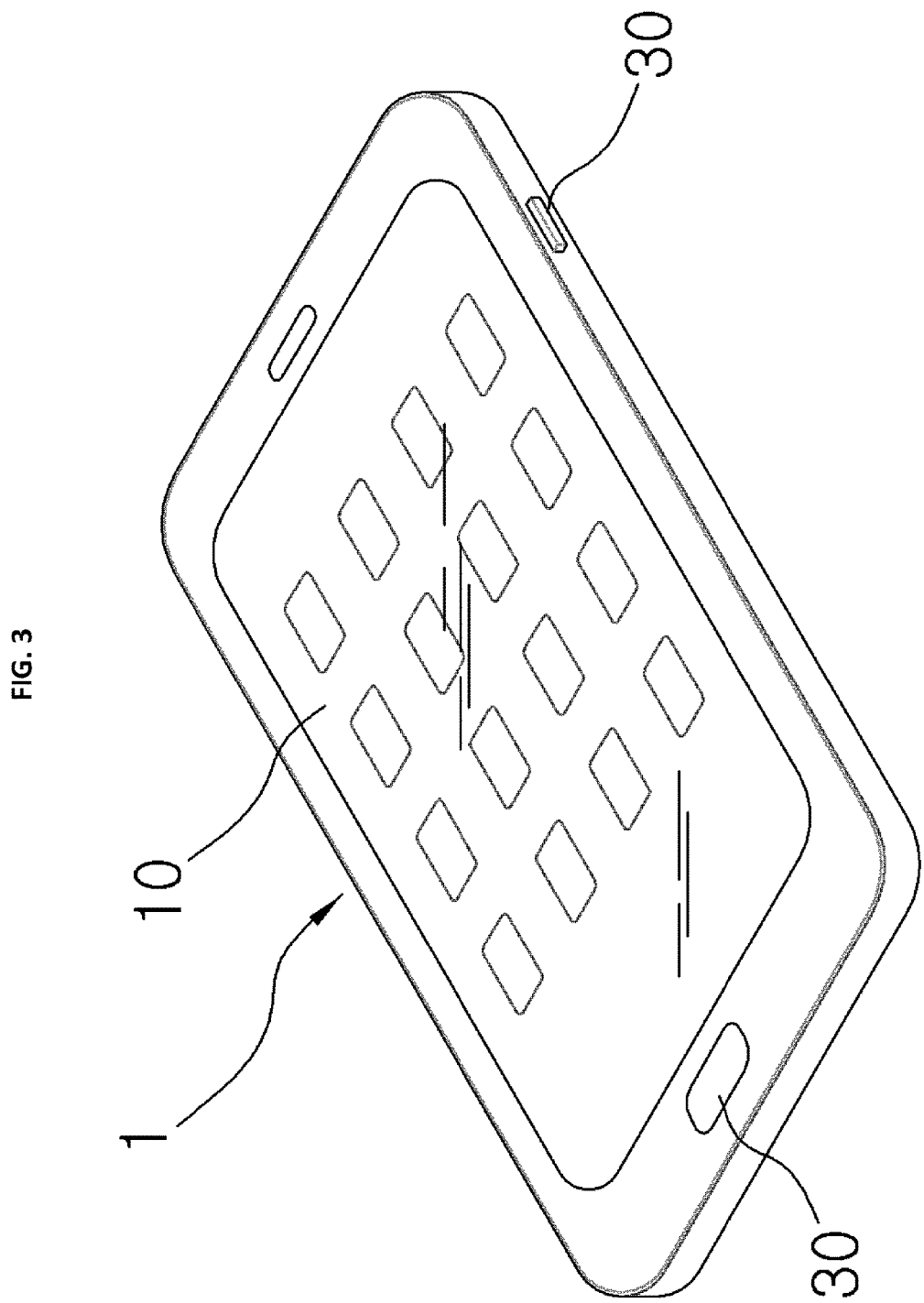
FIG. 3 is a view illustrating a front surface of a portable terminal according to the present invention.

FIG. 3 is a view illustrating a front surface of a portable terminal according to the present invention. As illustrated in FIG. 3, the display unit 10 is provided on the front surface of a body 1 like that of a typical portable terminal according to the related art.

Figure 5:
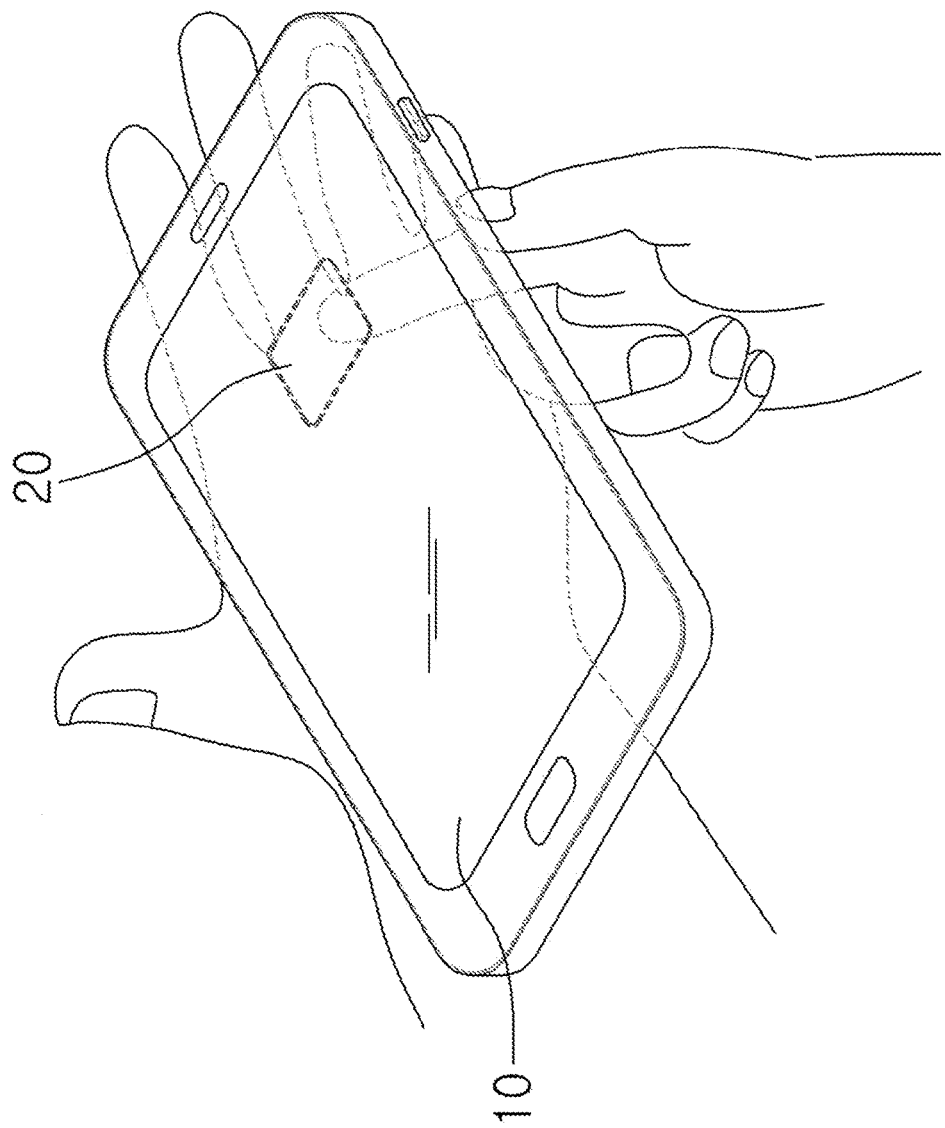
FIGS. 5 and 6 are views illustrating an action of inputting a password into the portable terminal according to the present invention.
Figure 6:
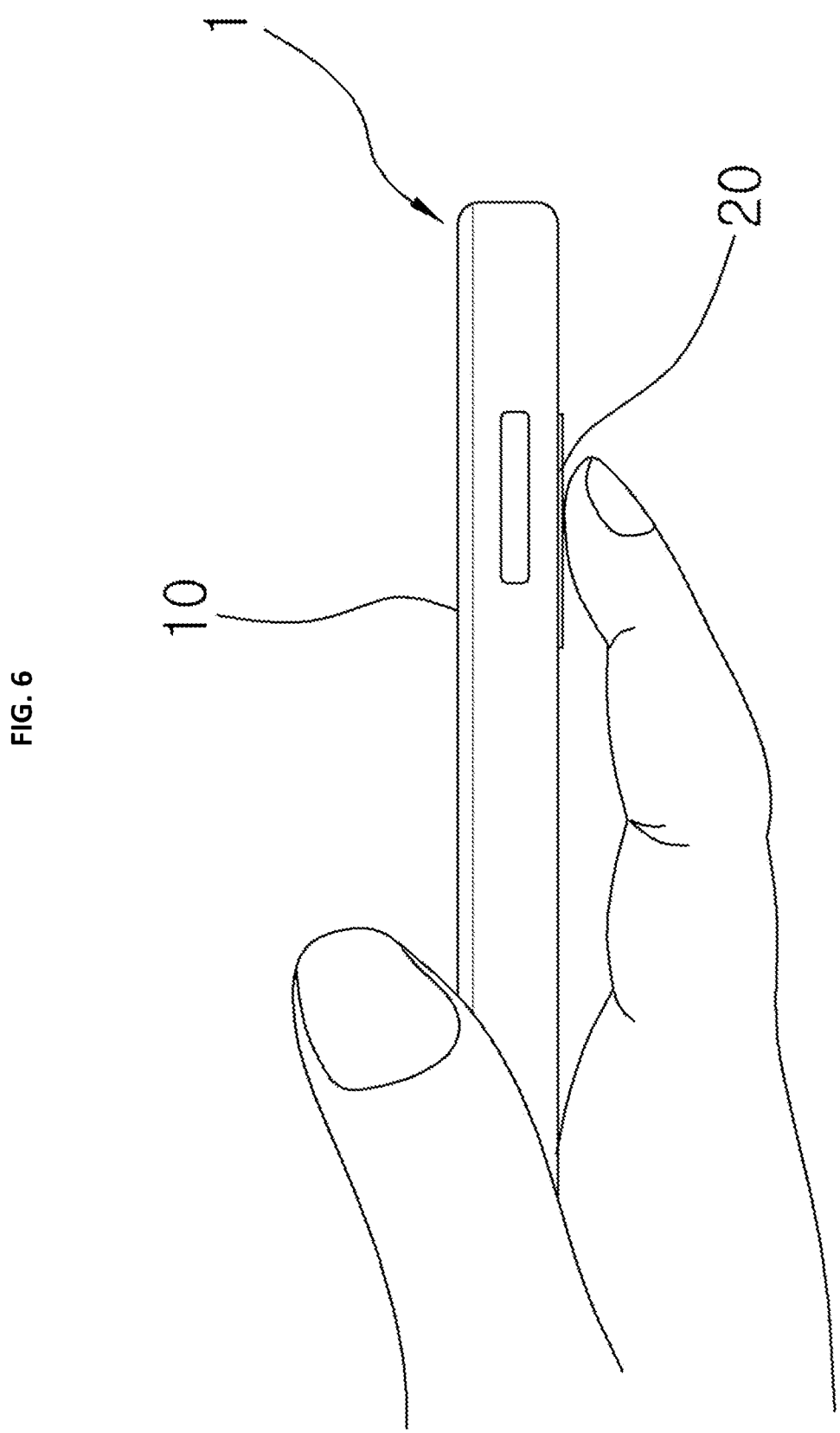

Accordingly, as illustrated in FIGS. 5 and 6, a user grips the portable terminal with the front surface facing up to view the display unit 10. In this state, the user touches various functional menus displayed on the display unit 10 for inputting to activate and use various functions of the portable terminal.

Although a password for setting and releasing of use restriction is input through a screen image displayed on the display unit 10 provided on the front surface of the body 1 in a typical portable terminal according to the related art, the present invention has a basic difference from the related art in that the password for setting and releasing of the use restriction is input through the rear password input unit 20 according to the present invention.

Figure 4:
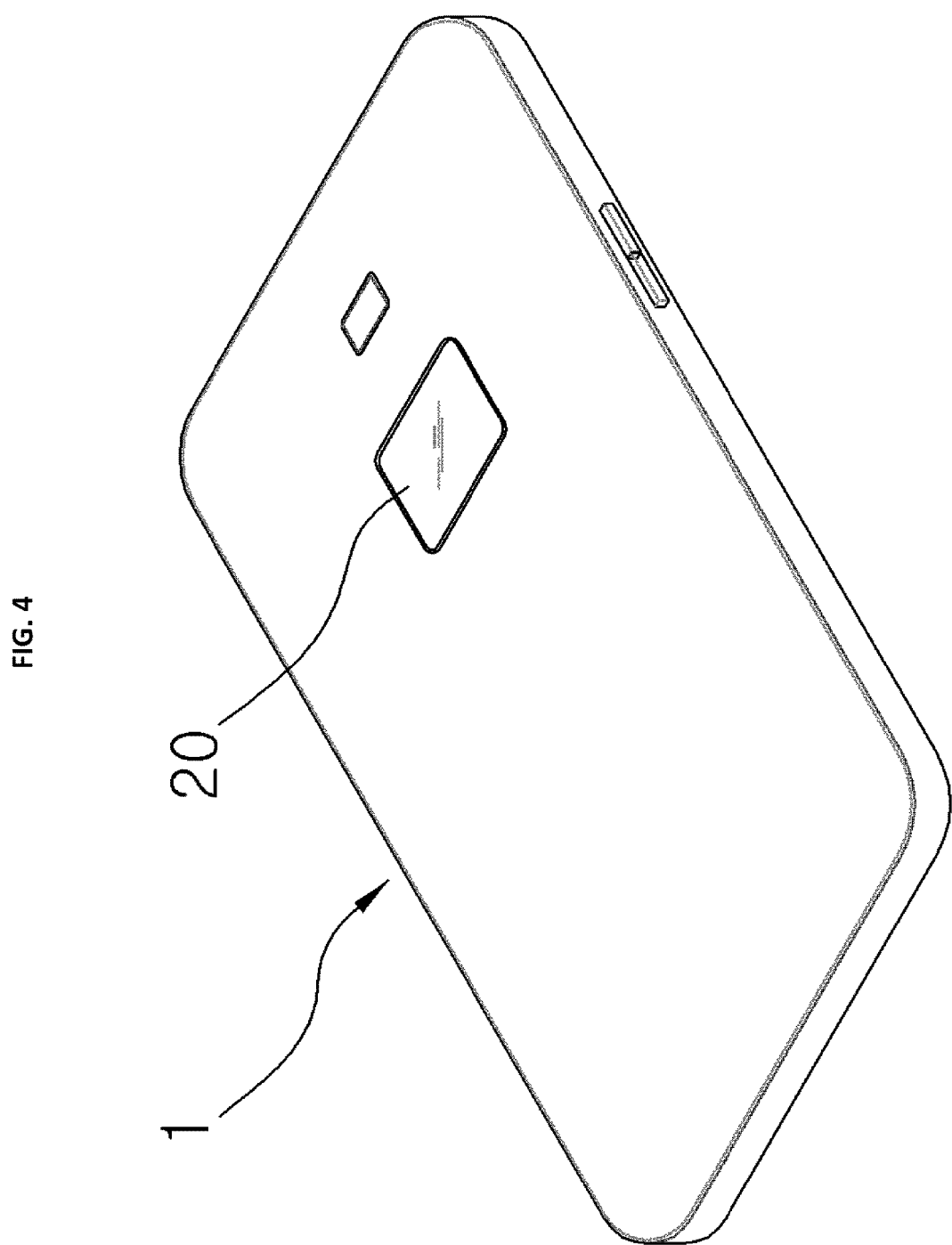
FIG. 4 is a view illustrating a rear surface of a portable terminal according to the present invention.

FIG. 4 is a view illustrating a rear surface of the portable terminal according to the present invention. The rear password input unit 20 performs a function of inputting the password for the setting and the releasing of the use restriction for the portable terminal. As illustrated in FIG. 4, the rear password input unit 20 is provided at an opposite side to the display unit 10, that is, on the rear surface of the body 1 of the portable terminal.

Accordingly, as illustrated in FIGS. 5 and 6, the user grips the portable terminal with the front surface of the body 1 facing up while inputting the password for the setting and the releasing of the use restriction through the rear password input unit 20 provided on the rear surface.

The rear password input unit 20 may be realized using various sections according to the embodiments, and the password for the use restriction may be set variously depending on the realization sections.

First, the rear password input unit 20 may be realized using a touch sensor that allows the user to input the password by touching the rear password input unit 20 with a finger of the user, and the password for the setting of the use restriction may have a specific shape.

In this case, as the user touches the rear password input unit 20 realized using the touch sensor with the finger of the user, the specific shape may be expressed, or memorized in at least one of shapes such as a letter, a number, a symbol, a figure, and a graphic.

For example, as illustrated in FIG. 7(*a*), if the user touches the rear password input unit 20 to express a letter of "G", the letter of "G" becomes the set password. When a G-shaped pattern matched to the set password is input, the use restriction is released.

In addition, the rear password input unit 20 may be realized using a direction input section allowing the user to input directionality by dragging the finger of the user. The direction input section may include a track point or a joy stick.

When the rear password input unit 20 is realized using the direction input section, the password for the setting of the use restriction may be a directional pattern created as the direction input section is dragged in various directions at least one time.

Figure 8:
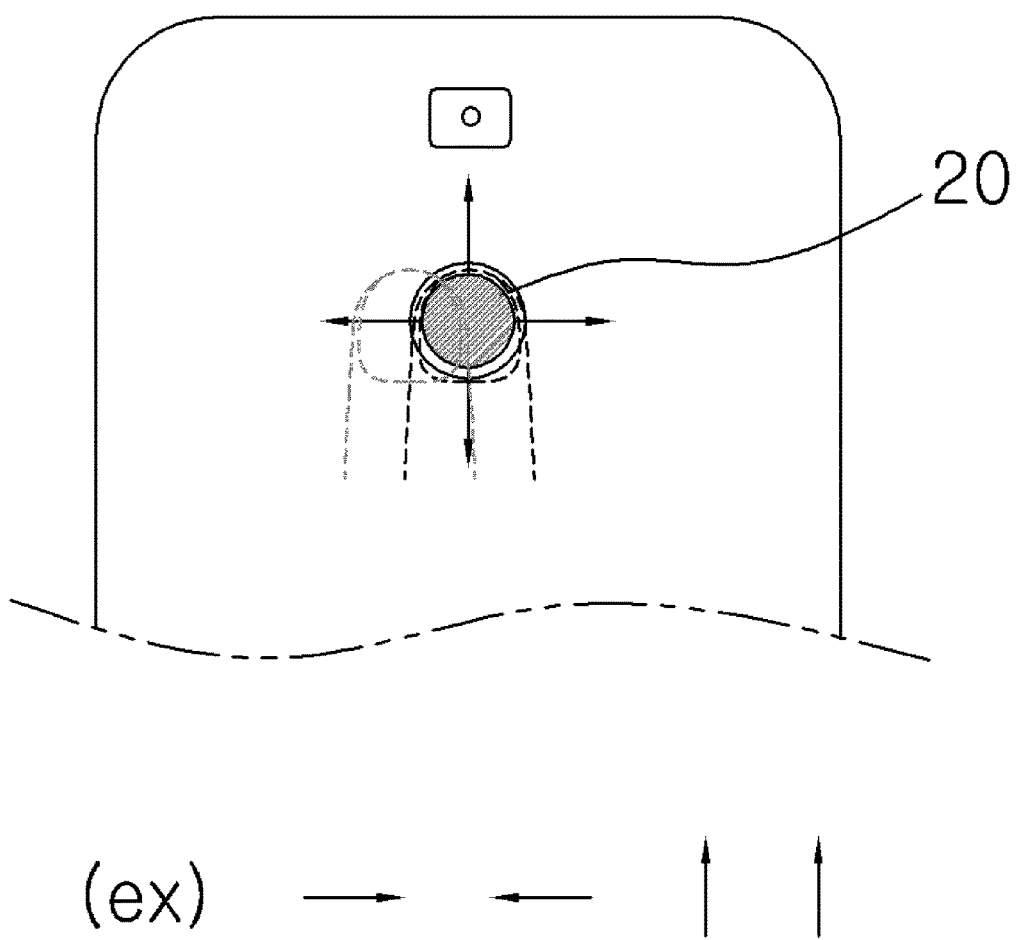
FIG. 8 is a view illustrating the inputting of the password to be set in a directional pattern onto the rear surface.

For example, FIG. 8 illustrates one example of the password created as the direction pattern. As illustrated in FIG. 8, the user sequentially drags the finger of the user in directions of →, ←, ↑, and ↑ on the rear password input unit 20 to set the password having the directional pattern. When releasing the setting of the password, the user inputs the password matched to the set directional pattern for the releasing of the use restriction.

In addition, the rear password input unit 20 may be realized using a touch sensor divided into a plurality of touch regions. Multiple touch regions may be formed, that is, two touch regions may be formed by dividing the touch sensor into the top and the bottom or the left and right, or nine touch regions may be formed by dividing the touch sensor in a 3×3 matrix. FIG. 9 illustrates fourth touch regions formed by dividing the touch sensor into the top, the bottom, the left, and the right.

In addition, when the rear password input unit 20 is realized in such a manner, the password for the setting of the use restriction may be a sequential pattern created as the multiple touch regions are selectively touched at least one time.

For example, FIG. 9 illustrates one example of the password created as the sequential pattern. As illustrated in FIG. 9, the user sequentially touches a left upper portion, the left upper portion, a left lower portion, and a right upper portion among the four touch regions of the rear password input unit 20 to set the password of the sequential pattern. When releasing the setting of the use restriction, the user touches the corresponding touch regions in the same pattern as the set sequential pattern to input the password and thus releases the use restriction.

In addition, the rear password input unit 20 may be realized using a touch sensor or a push button. In this case, a password for the setting of the use restriction may be a signal pattern created based on the frequency that the touch sensor or the push button is pressed and the interval between the pressing operations of the touch sensor or the push button.

In this case, the signal pattern is a password created similarly to a Morse code by distinguishing between the frequency that the user touches the touch sensor or presses the push button in a row and the frequency that the user presses the push button at a predetermined interval.

Figure 10:
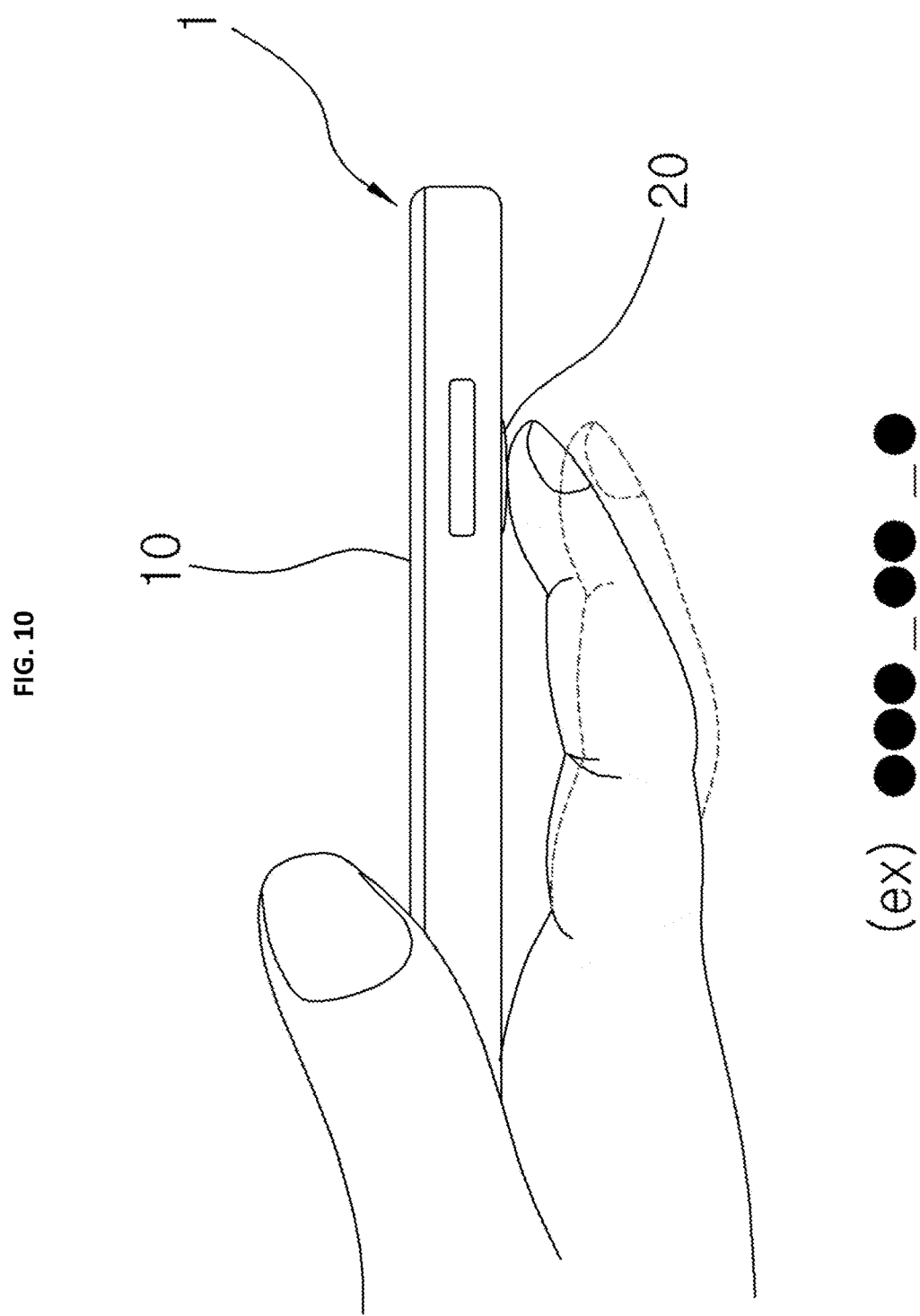
FIG. 10 is a view illustrating the inputting of the password to be set in a signal pattern onto the rear surface.

In other words, FIG. 10 illustrates a signal pattern created by pressing the rear password input unit 20 three times in a row, pressing the rear password input unit 20 two times after a predetermined period of time, and then pressing the rear password input unit 20 one time finally. The password having the signal pattern may be set as described above. When releasing the setting of the use restriction, the user inputs the password by pressing the rear password input unit 20 in the same pattern as the set signal pattern to release the use restriction.

In addition, the rear password input unit 20 may be a motion sensor to sense the motion of the finger of the user. In this case, the password for the setting of the use restriction may be a motion pattern by the finger of the user sensed by the motion sensor.

In other words, if a user moves the finger of the user in front of the motion sensor while forming a specific motion pattern, the motion pattern of the finger is sensed by the motion sensor and set as a password. When releasing the setting of the use restriction, the user moves the finger in the same motion pattern as the setting motion pattern to release the use restriction.

In the case of a portable terminal provided on the rear surface of a body thereof with a camera, the motion sensor may be installed integrally with the camera. The motion sensor may employ various types of sensors, such as a transmission type-photoelectric sensor, a direct reflective photoelectric sensor, a mirror reflective photoelectric sensor, a high-frequency oscillation type-proximity sensor, a capacitive proximity sensor, a magnetic proximity sensor, and an infrared proximity sensor, which are well known to those skilled in the art.

As described above, the rear password input unit 20 is realized using various sections to receive passwords set in various patterns. Even if the rear password input unit 20 is realized using any section, the rear password input unit 20 is provided on the rear surface of the body 1 of the portable terminal. Accordingly, when the user grips the portable terminal normally as illustrated in FIGS. 5 and 6 (that is, in the manner of facing up the display unit 10 provided on the front surface of the portable terminal) and inputs the password through the rear password input unit 20, both of a password inputting action, such as a touching action or a dragging action, of the user and the rear password input unit 20 are naturally hidden by the body 1 of the portable terminal, thereby effectively preventing the information of the input password from being exposed to others around the user.

The user input unit 30 may include variously-shaped input buttons that allow the user to input instructions through the operation thereof, and may be provided on the front surface or the lateral side of the body 1 of the portable terminal.

The user input unit 30 receives instructions to control various operations, such as starting, terminating, scrolling, and controlling of a sound volume, of the portable terminal and sends the instructions to the control unit 50. Particularly, the user input unit 30 may receive instructions for the setting and the releasing of the use restriction and send the instructions to the control unit 50.

The storage unit 40 may be realized using at least one of storage media such as a flash memory type, a hard disk type, or a multi-media card micro-type of a memory, a card type memory (SD or XD memory), a RAM, a ROM, an EEPROM, a PROM, a magnetic memory, a magnetic disk, and an optical disk.

The storage unit 40 stores various pieces of information required for the operations of the portable terminal or generated during the operation of the portable terminal. In other words, the storage unit 40 may store programs for processing and control operations of various signals, which is to be performed by the control unit 50 to be described later, input/output data, or an image, a voice or a data signal, which is subject to signal-processing. In particular, the storage unit 40 stores the password for setting of the use restriction input through the rear password input unit 20 under the control of the control unit 50.

The control unit 50 controls the overall operations of the portable terminal, and particularly controls the operations for the setting and the releasing of the use restriction according to the present invention.

In detail, the control unit 50 controls the rear password input unit 20 to be in an input standby state if an instruction for setting of the use restriction is input from the user through the user input unit 30. If a password for setting of the use restriction is input through the rear password input unit 20, the control unit 50 stores the password for the setting of the use restriction into the storage unit 40 and sets the use restriction.

In addition, the control unit 50 controls the rear password input unit 20 to be in the input standby state if an instruction for the releasing of the use restriction is input from the user in the state that the use restriction is set, and determines the releasing of the use restriction depending on the password for releasing of the use restriction, which is input through the rear password input unit 20.

In other words, if the password for the releasing of the use restriction is input through the rear password input unit 20, the control unit 50 compares the input releasing password with the setting password stored in the storage unit 40. If the input releasing password is matched to the setting password, the control unit 50 controls the portable terminal to be available by releasing the use restriction. Otherwise, the control unit 50 controls the portable terminal not to be available by maintaining the use restriction.

Meanwhile, description has been made in that the rear password input unit 20 may be realized using various sections and thus the password for the use restriction may be variously set through the above configuration. As the rear password input unit 20 is realized using the touch sensor among the various sections, when the setting password is formed in a specific form of a letter, a number, a symbol, or a graphic, errors may occur in releasing the use restriction depending on directional states of the portable terminal when inputting the password. Accordingly, in order to prevent the errors, additional components may be provided.

In other words, the user must input the password into the rear password input unit 20 while gripping the portable terminal to face down the rear password input unit 20 so that the input action of the password is not exposed to others when the user releases the use restriction for the portable terminal in a space shared with the others. However, the user may input the password into the rear password input unit 20 while gripping the overturned portable terminal to face up the rear password input unit 20 since the password may not be exposed to others when the user releases the use restriction for the portable terminal in a space where the user is left alone.

In this case, the input state of the password into the rear password input unit, which faces down, is defined as a normal input state, and the input state of the password into the rear password input unit 20, which faces up in the overturn portable terminal, is defined as a reverse input state.

When a password is input into the rear password input unit 20 in the reverse input state in order to release the use restriction, and particularly, the setting password has a specific shape, even if the user inputs a password having the same shape as that of the password set in the reverse input state, the shape of the password is reversely input as if the password is reflected in a mirror. Accordingly, the control unit 50 determines the input password as being mismatched from the set password in shape and thus does not release the use restriction, thereby causing errors.

That is to say, if a setting password is stored by inputting a letter of "G" in the normal input state as illustrated in FIG. 7(*a*), the stored setting password is reversed as illustrated in FIG. 7(*b*) when viewed from the rear surface of the portable terminal. Accordingly, if the user identically inputs the latter of "G" into the rear password input unit 20 in the reverse input state, the control unit 50 determines the stored setting password as being mismatched from the input releasing password.

Figure 2:
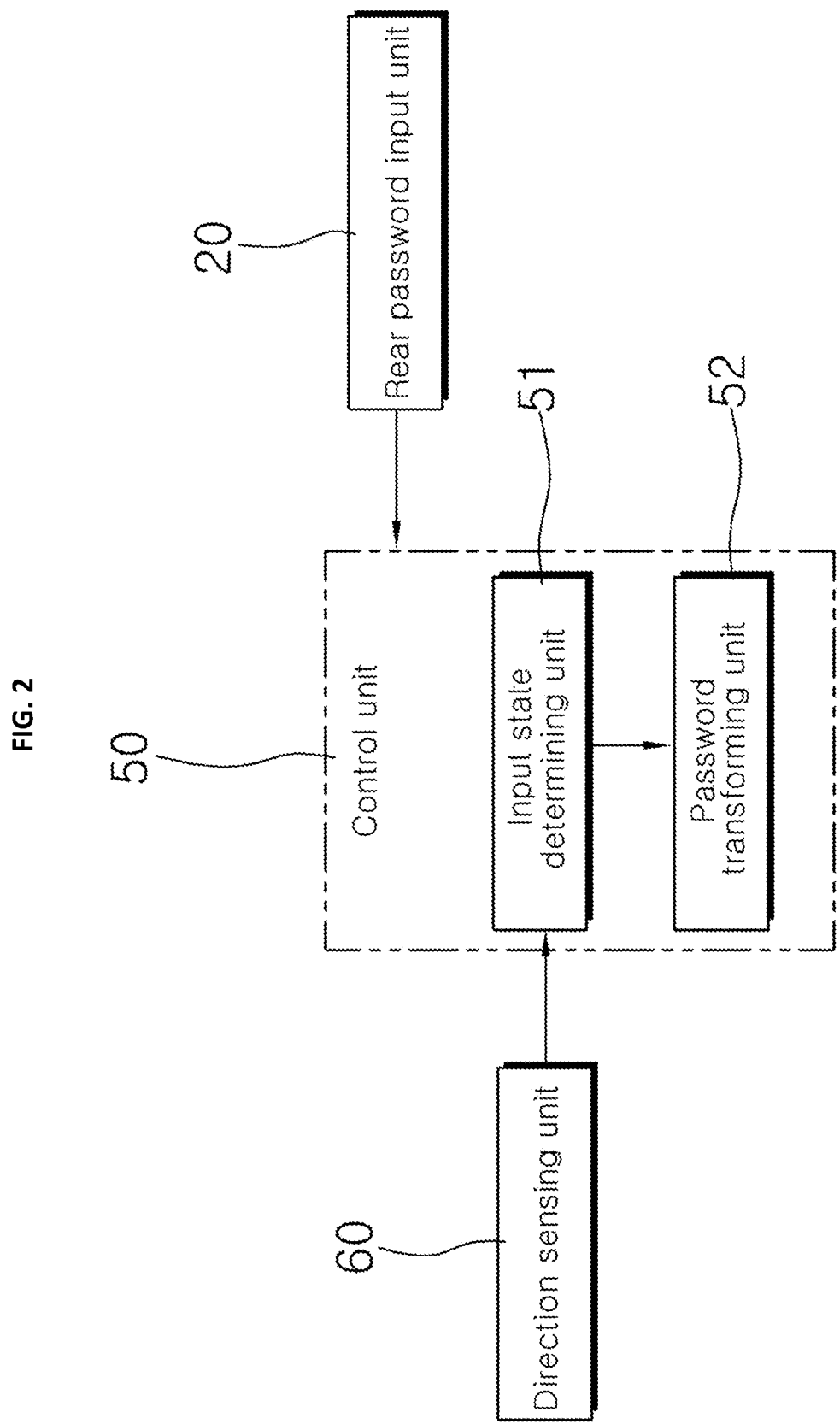
FIG. 2 is a block diagram illustrating a control unit according to the first embodiment.

Therefore, in order to prevent the errors in releasing the use restriction, the portable terminal may further include a direction sensing unit 60, and the control unit 50 may be configured to include an input state determining unit 51 and a password transforming unit 52 as illustrated in FIG. 2.

The direction sensing unit 60 senses a direction that the rear password input unit 20 faces, that is, senses whether the rear password input unit 20 faces down or up.

The input state determining unit 51 receives a sensing signal from the direction sensing unit 60 to determine whether the rear password input unit 20 is in the normal input state to face down or in the reverse input state to face up, if the releasing password is input through the rear password input unit 20.

If the input state determining unit 51 determines the rear password input unit 20 as being in the reverse input state, the password transforming unit 52 reverses the shape of the input releasing password to a shape reflected in a mirror.

Accordingly, the reversed shape of the releasing password input through the password transforming unit 52 becomes the same shape as that of the stored setting password. Because of this, only if the user inputs the same password, even if a releasing password is input in the reverse input state, the control unit 50 determines the input releasing password as being matched to the setting password to release the use restriction.

Figure 11:
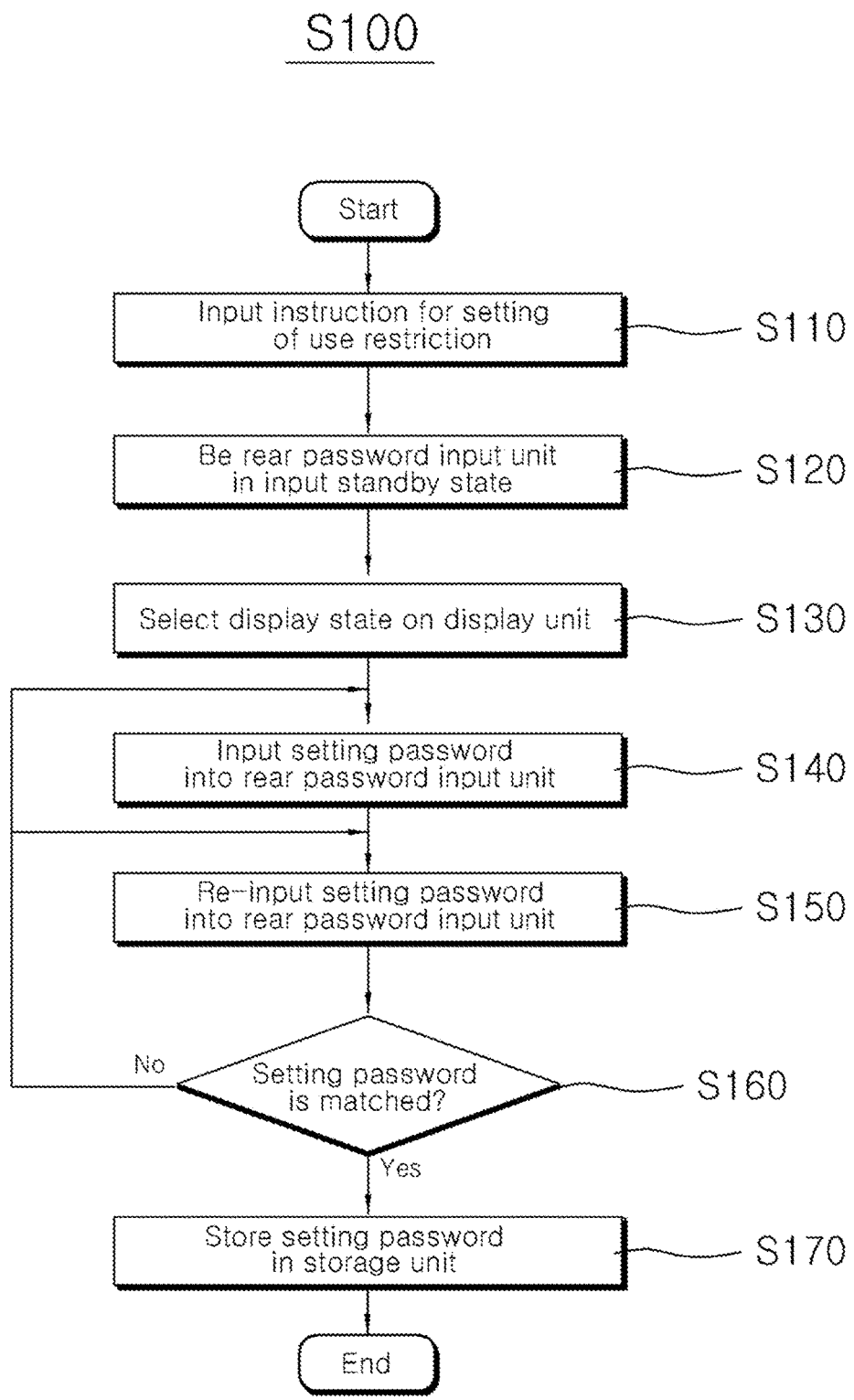
FIG. 11 is a flowchart illustrating the steps of setting use restriction according to the first embodiment.
Figure 12:
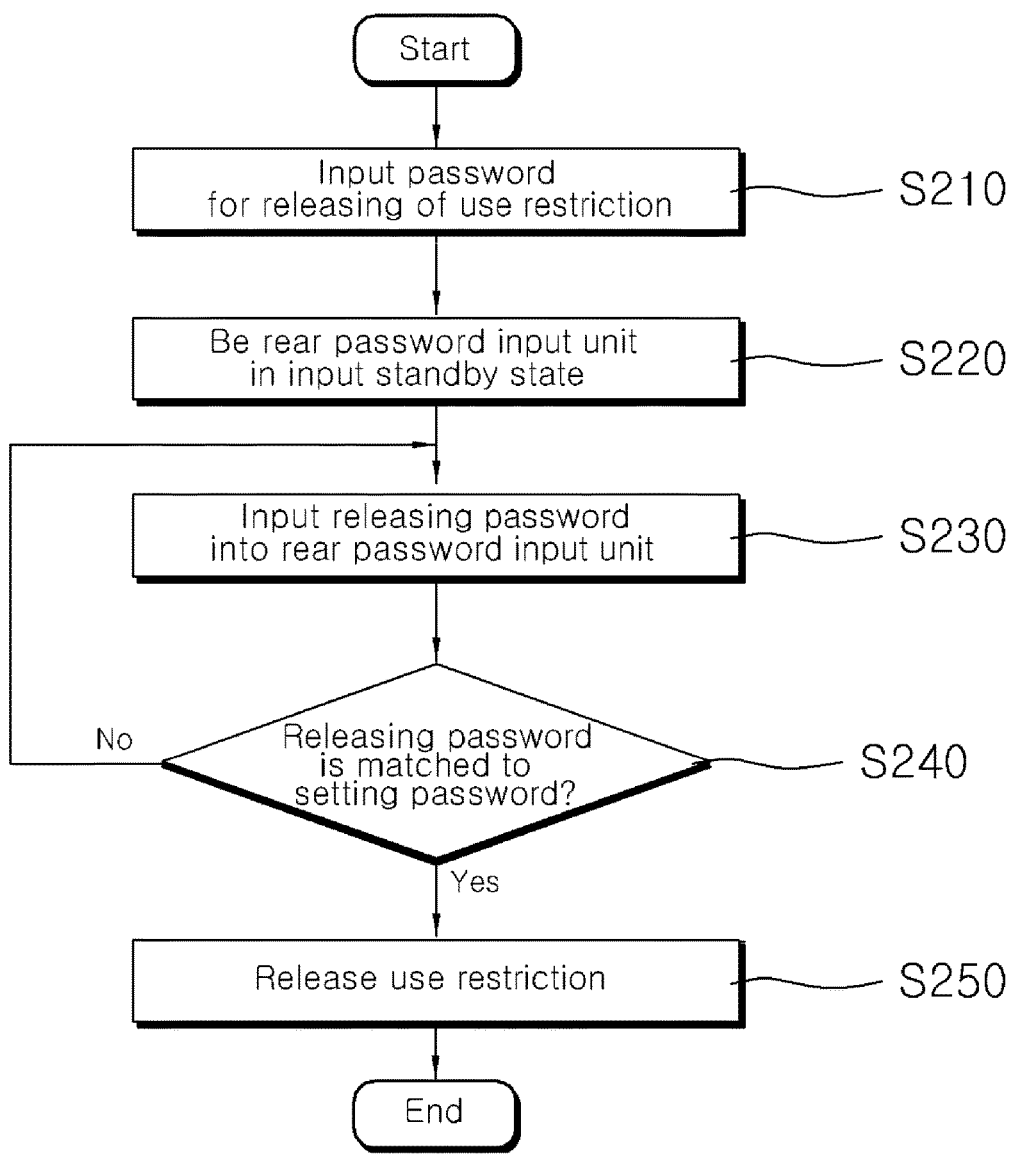
FIG. 12 is a flowchart illustrating the steps of releasing the use restriction according to the first embodiment.

The configuration of the portable terminal according to the first embodiment has been described, and a method of setting and releasing the use restriction for the portable terminal having the above configuration will be described with reference to the flowcharts shown in FIGS. 11 to 13 below.

The method of releasing and setting the use restriction for the portable terminal according to the present invention may include a step of setting the use restriction (S100) and a step of releasing the set use restriction (S200).

First, the step of setting the use restriction (S100) will be described with reference to the flowchart shown in FIG. 11.

The control unit 50 controls the rear password input unit 20 to be in an input standby state (S120) so that the setting password may be input if an instruction for the setting of the use restriction is input from the user (S110). In this case, the control unit 50 may further perform a step (S130) of receiving from the user the selection of whether or not to display the setting password, which is to be input in the subsequent step of inputting the setting password, on the display unit 10, by displaying a selection menu on the display unit 10 so that the user may select whether or not to display the setting password input through the rear password input unit 20 on the display unit 10.

Then, the rear password input unit 20 receives the setting password from the user (S140).

In this case, the input setting password may be one of a specific shape, a directional pattern, a sequential pattern, a signal pattern, and an operating pattern depending on sections used to realize the rear password input unit 20. Since the sections used to realize the rear password input unit 20 and the type of the setting password have been described above in detail in the configuration of the portable terminal, the details thereof will be omitted below in order to avoid redundancy.

If the setting password is input, the control unit 50 may display a screen image of "Please input the password once more" on the display unit 10, and the rear password input unit 20 may receive the setting password from the user again (S150).

In this case, if the user selects that the setting password is displayed on the display unit 10, and inputs, for example, the letter of "G" input into the rear password input unit 20, the control unit 50 may display a screen image of "G is right?" on the display unit 10 to determine if the user correctly recognizes the input setting password.

In this case, it is preferred that the process of displaying the setting password on the display unit 10 in order to check the input setting password is performed only when the user sets the use restriction in a space where the user is left alone because the setting password may leak in a space with others around the user.

If the same setting password is input once more, the control unit 50 determines if the input setting password is matched to the setting password which is input once more (S160).

If the setting password, which is input first, is mismatched from the setting password, which is input once more, according to the determination result, an error message of "passwords are mismatched from each other is displayed and the procedure is returned to step S140 or S150. If two setting passwords are determined as being matched to each other, the corresponding setting password is stored in the storage unit 40 (S170).

The step (S100) of setting the use restriction is completed through the above steps.

If the use restriction has been set through the setting step (S100), the portable terminal executes a use restriction function after predetermined time has elapsed without an external operation or an external input. In order for a user to use the portable terminal under the execution of the use restriction function, the use restriction function must be released. Accordingly, hereinafter, the step of releasing the use restriction (S200) will be described with reference to FIG. 12.

If the instruction for the releasing of the use restriction is input from the user under the execution of the use restriction (S210), the control unit 50 controls the rear password input unit 20 to be in the input standby state so that the releasing password may be input (S220).

Then, the rear password input unit 20 receives the releasing password from the user (S230).

If the releasing password is input, the control unit 50 compares the input releasing password with the setting password stored in the storage unit 40 to determine if the input releasing password is matched to the stored setting password (S240).

If the input releasing password is mismatched from the stored setting password according to the determination result, the control unit 50 performs a control operation so that the use restriction is maintained without change and displays the error message of "passwords are mismatched to each other" on the display unit 10 while requesting the user to input the releasing password again.

In addition, if the input releasing password is matched to the stored setting password according to the determination result, the control unit 50 immediately releases the use restriction in progress (S250).

The releasing step (S200) is completed through the above steps.

Figure 13:
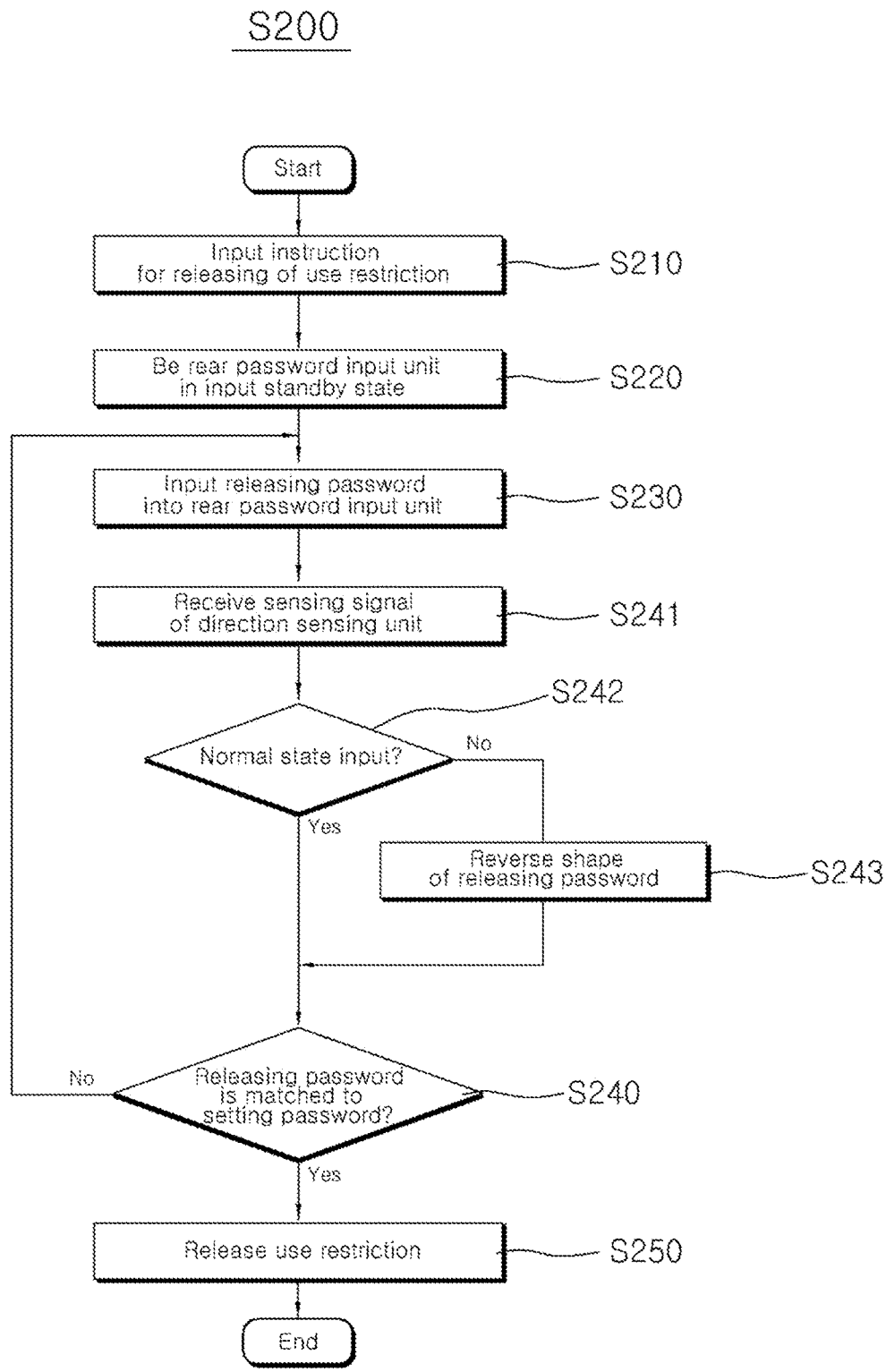
FIG. 13 is a flowchart illustrating the steps of determining the releasing of the use restriction by determining an input state when releasing the use restriction.

Meanwhile, the control unit 50 may perform steps illustrated in FIG. 13 before determining the releasing of the use restriction by comparing the input releasing password with the setting password, when the rear password input unit 20 is realized using the touch sensor and the setting password has a specific shape, in step S240 of determining the releasing the use restriction.

First, the control unit 50 receives the signal related to the facing direction of the rear password input unit 20 from the directing sensing unit 60 (S241).

Thereafter, the control unit 50 determines depending on the sensing signal from the directing sensing unit 60 whether the releasing password is input in the normal input state that the rear password input unit 20 faces down, or in the reverse input state that the rear password input unit 20 faces up (S242).

If determining the releasing password as being input in the normal input state, the control unit 50 compares the input releasing password with the setting password stored without change to determine whether to release the use restriction (S240).

On the contrast, if determining the input releasing password as being input in the reverse input state, the control unit 50 reverses the input releasing password to have the shape reflected in a mirror (S243).

Then, the control unit 50 determines whether or not to release the use restriction by comparing the releasing password having the reversed shape with the stored setting password (S240).

Figure 14:
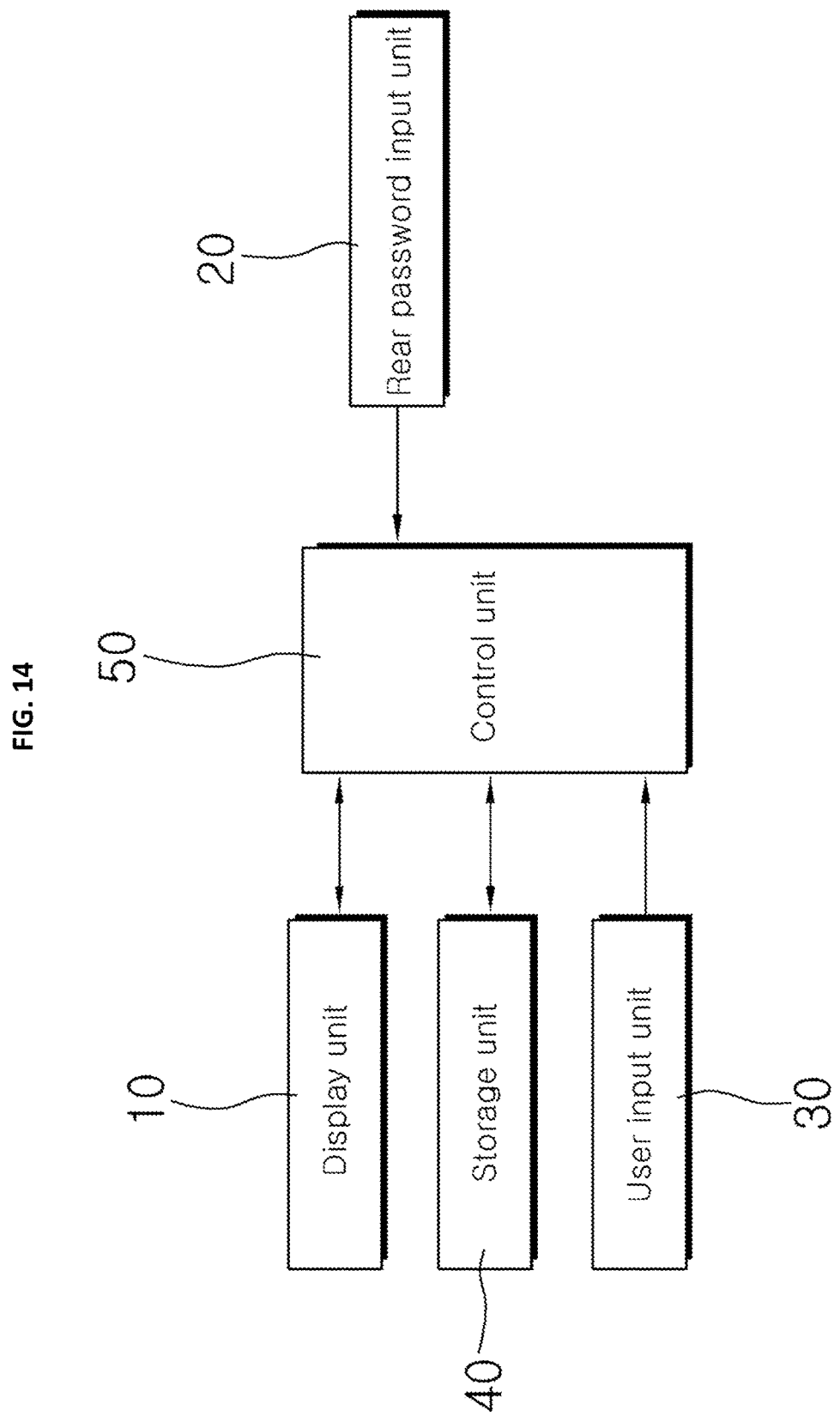
FIG. 14 is a block diagram illustrating a portable terminal according to a second embodiment.

FIG. 14 is a block diagram illustrating a portable terminal according to a second embodiment of the present invention which has the same configuration as that of the first embodiment described above except that that the directing sensing unit 60 is not included and the control unit 50 is configured to release the use restriction if the releasing password is matched to or symmetrical to the setting password after comparing the releasing password with the stored setting password. Accordingly, the following description will be made while focusing on the difference between the first and second embodiments.

Figure 15:
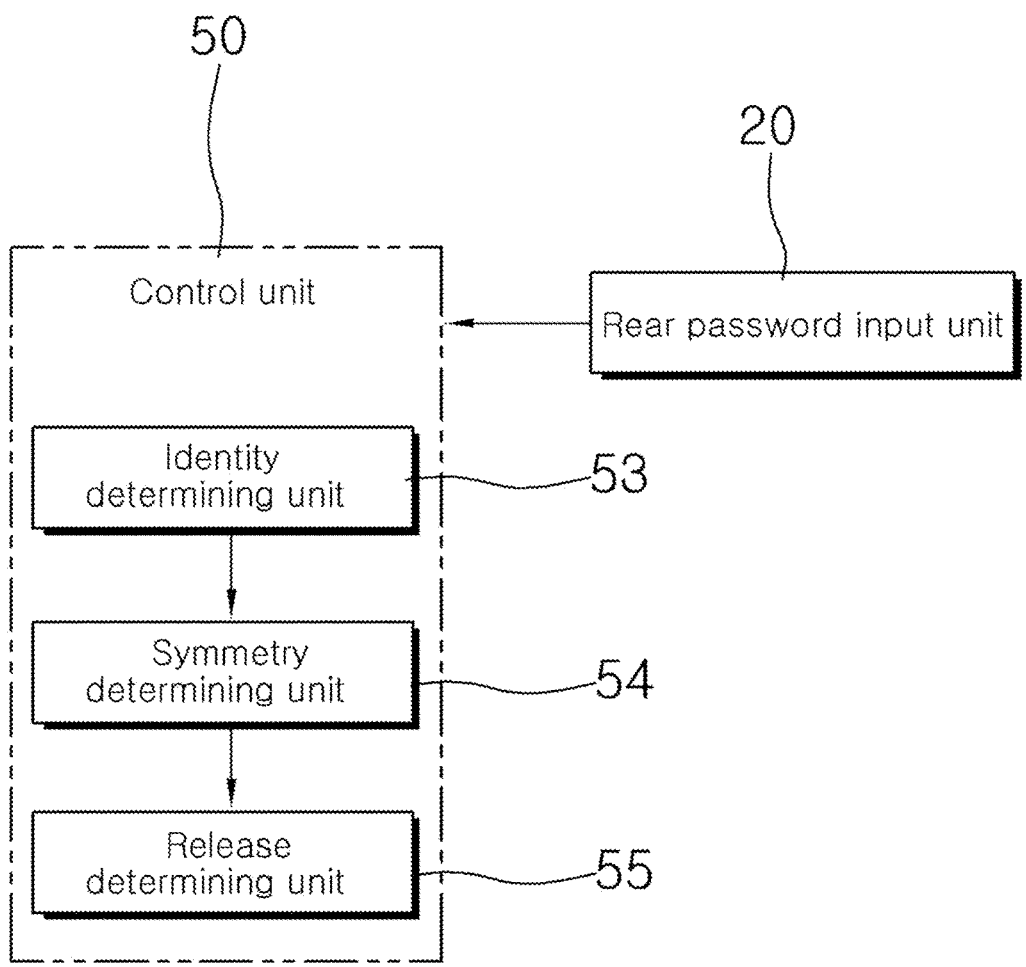
FIG. 15 is a block diagrams illustrating a control unit according to the second embodiment.

The control unit 50 according to the present embodiment may include an identity determining unit 53, a symmetry determining unit 54, and a release determining unit 55 as illustrated in FIG. 15.

If the releasing password is input to release the use restriction, the identity determining unit 53 compares the input releasing password with the setting password stored in the storage unit 40 to determine the identity between two passwords.

The symmetry determining unit 54 compares the input releasing password with the setting password stored in the storage unit 40 to determine the symmetry between two passwords.

The release determining unit 55 releases the use restriction if the identity determining unit 53 determines the releasing password as being matched to the setting password. If the identity determining unit 53 determines the releasing password as being different from the setting password, and if the symmetry determining unit 54 determines the releasing password as being symmetrical to the setting password, the release determining unit 55 releases the use restriction.

In other words, the control unit 50 is characterized with the configuration to release the use restriction when the releasing password and the setting password are not only matched to each other, but also symmetrical to each other, instead of the configuration to release the use restriction only when the input releasing password is matched to the stored setting password.

Accordingly, the user may input a password by changing the direction of the rear password input unit 20 according to use environments, when attempting to set or release the use restriction by inputting the setting password or the releasing password into the rear password input unit 20. In the case of inputting the password by changing the direction of the rear password input unit 20, if only the identity between the passwords is determined, errors may occur in releasing the use restriction. Therefore, the errors, which may occur in releasing the use restriction, can be prevented, so that the use restriction function can be smoothly performed.

In addition, although the user inputs the password into the rear password input unit 20 while gripping the portable terminal normally (that is, while facing the display unit 10 provided on the front surface of the portable terminal) as illustrated in FIG. 5, the user may input the password into the rear password input unit 20 while gripping the overturned portable terminal (that is, while facing the rear password input unit 20 on the rear surface of the portable terminal) when setting or releasing the use restriction in the space where the user is left all alone, which may not be exposed to others Therefore, according to the use environment, the user may input the setting password into the rear password input unit 20 while gripping the portable terminal normally to execute the use restriction and then input the releasing password into the rear password input unit 20 while gripping the overturned portable terminal. On the contrast, the user may input the setting password into the rear password input unit 20 while gripping the overturned portable terminal to execute the use restriction, and then input the releasing password into the rear password input unit 20 while gripping the portable terminal normally. In other words, the setting password and the releasing password may be input into the rear password input unit 20 in mutually different directions. In these cases, even though the user inputs the setting password and the releasing password matched to each other into the rear password input unit 20, both of the setting password and the releasing password become symmetrical to each other. Accordingly, if the control unit 50 determines only the identity between the setting password and the releasing password, the control unit 50 may determine the setting password as being different from the releasing password so that the use restriction may not be released.

For example, when the letter of "G" is input into the rear password input unit 20 in the normally gripping state of the portable terminal, the setting password is stored, and the use restriction function is executed as illustrated in FIG. 7(a), the stored setting password is represented in a symmetrical shape thereto as illustrated in FIG. 7(b) when viewed from the rear surface. Accordingly, even if the user inputs the letter of "G" into the rear password input unit 20 as the releasing password matched to the setting password while gripping the overturned portable terminal, the releasing password is represented as being symmetrical to the setting code input when the portable terminal is gripped normally. Therefore, the control unit 50 is configured to determine the identify and the symmetry between two passcodes through the identity determining unit 53 and the symmetry determining unit 54, respectively, and to release the use restriction through the release determining unit 55 if the passwords are determined as being matched to each other, or if the passwords are determined as being symmetrical to each other and not matched to each other, thereby preventing the errors.

In this case, in the following description, regarding a direction of inputting the setting password or the releasing password for the use restriction into the rear password input unit 20, an input direction when the user grips the portable terminal normally to face the display unit 10 on the front surface of the portable terminal is defined as a forward direction, and an input direction when the user overturns and grips the portable terminal to face the rear password input unit 20 is defined as a reverse direction.

Figure 16:
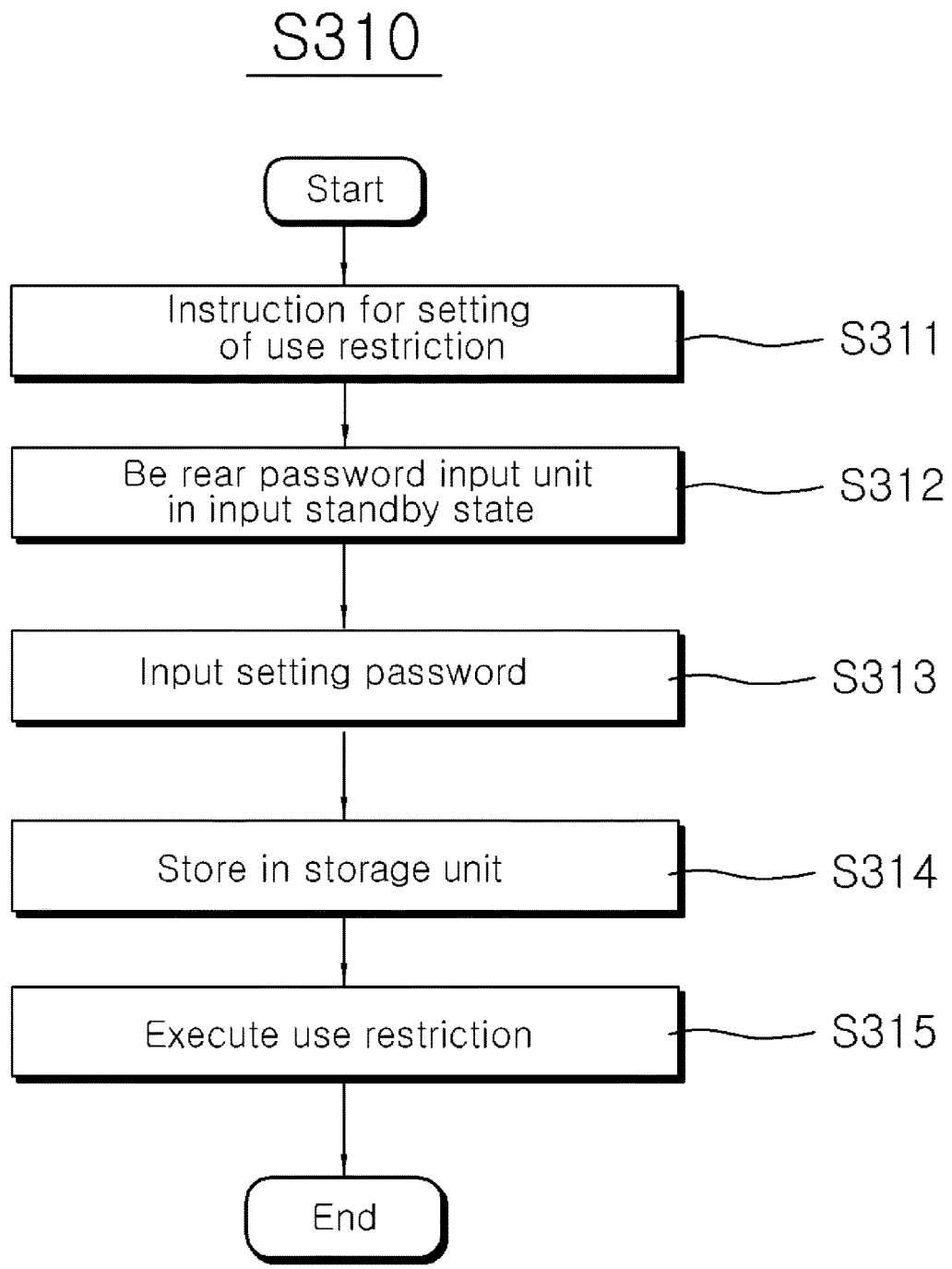
FIG. 16 is a flowchart illustrating the steps of setting the use restriction according to the second embodiment.

As described above, the configuration of the portable terminal according to the second embodiment of the present invention has been described. Hereinafter, a method of setting and releasing the use restriction for the portable terminal having the above configuration will be described with reference to FIGS. 16 and 17.

The method of setting and releasing the use restriction may be mainly classified into steps of setting the use restriction (S310) and of releasing the use restriction that has been set (S320). First, the step of setting the use restriction (S310) will be described below with reference to the flowchart illustrated in FIG. 16.

If the instruction for the setting of the use restriction is input from the user (S311), the control unit 50 controls the rear password input unit 20 to be in the input standby state so that the setting password may be input (S312).

Then, the rear password input unit 20 receives the setting password from the user (S313).

In the step of inputting the setting password (S313), setting passwords may be received from the user twice in order to prevent an input error. Only if the setting passwords, which are input twice, are matched to each other, the control unit 50 may determine that the setting password is correctly input and control the procedure to the next step.

If the setting password is correctly input into the rear password input unit 20 in step S313, the control unit 50 stores the corresponding setting password into the storage unit 40 (S314) and executes the use restriction function of the portable terminal (S315). Through the above steps, the step of setting the use restriction is completed (S310).

Figure 17:
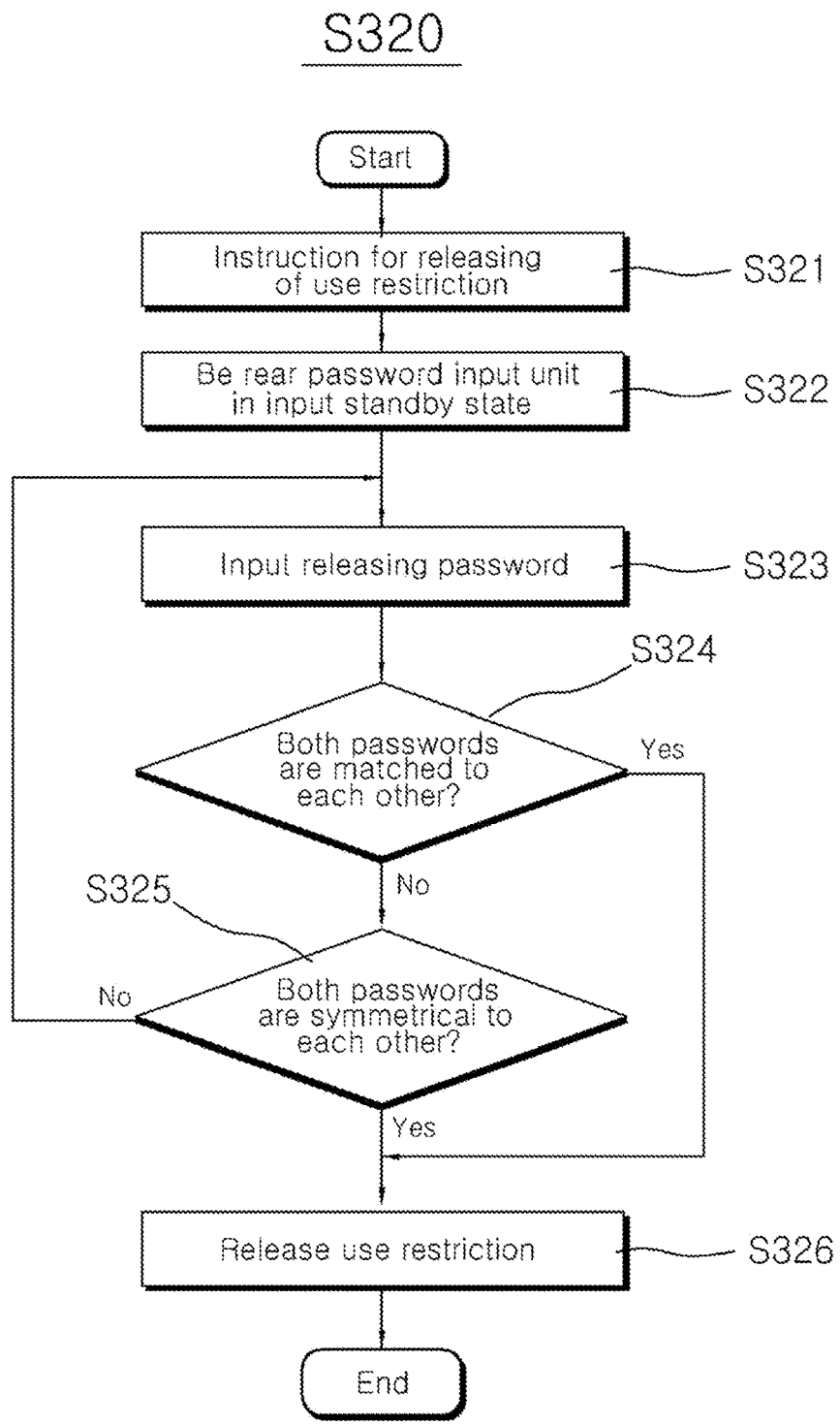
FIG. 17 is a flowchart illustrating the steps of releasing the use restriction according to the second embodiment.

Next, the step of releasing the use restriction (S320) will be described below with reference to the flowchart illustrated in FIG. 17. If the instruction for the releasing of the use restriction is input from the user under the execution of the use restriction function (S321), the control unit 50 controls the rear password input unit 20 to be in the input standby state so that the releasing password may be input (S322).

Then, the rear password input unit 20 receives the releasing password from the user (S323).

If the releasing password is input, the control unit 50 compares the input releasing password with the setting password stored in the storage unit 40. Accordingly, if the two passwords are matched to each other or symmetrical to each other, the use restriction function may be released. In detail, the identity between two passwords is primarily determined by comparing the input releasing password with the stored setting password (S324).

If the two passwords are matched to each other according to the determination result in step S324, step S326 is performed. If the two passwords are different from each other, the symmetry between the two passwords is secondarily determined by comparing the input releasing password with the stored setting password (S325).

In addition, the use restriction is released according to the determination results in steps S324 and S325 (S326). In other words, if the two passwords are determined as being matched to each other according to the determination result in the step S324, the use restriction may be released. If the two passwords are determined as being different from each other and symmetrical to each other according to the determination result in the step S325, the use restriction may be released. Through the above steps, the step of releasing the use restriction (S320) is completed.

If the two passwords are determined as being neither matched to nor symmetrical to each other according to the determination results in the steps S324 and S325, the control unit 50 performs a control operation to keep on executing the use restriction while displaying an error message of "the passwords are mismatched from each other" on the display unit 10 to request the user to input the releasing password again.

Figure 18:
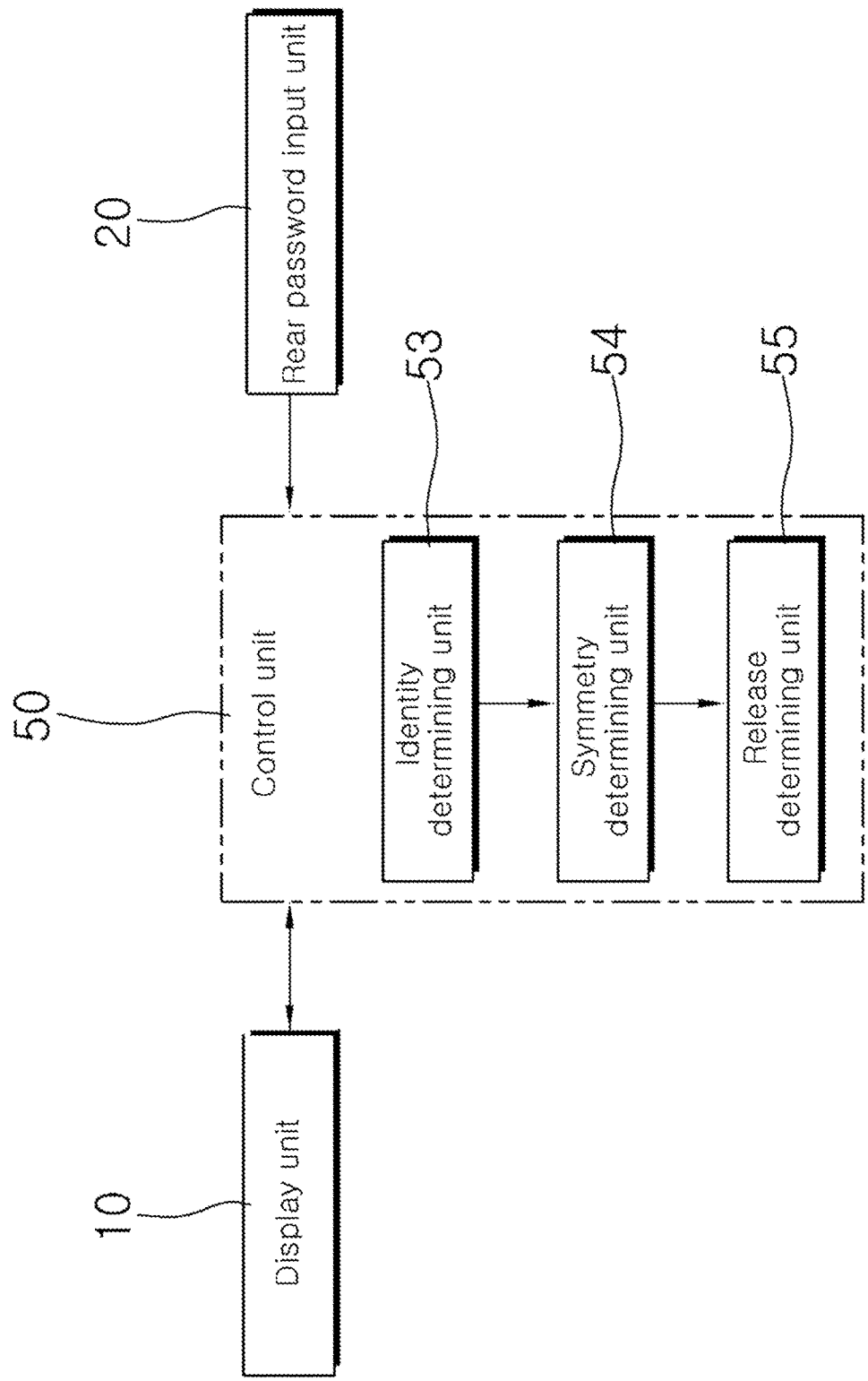
FIG. 18 is a block diagrams illustrating a control unit according to a third embodiment.

FIG. 18 is a block diagram illustrating a portable terminal according to the third embodiment of the present invention, which has the same configuration as that of the second embodiment except that the setting password or the releasing password for the use restriction is input into the display unit 10 as well as the rear password input unit 20.

That is to say, in the present embodiment, according to use environments, the user may input a password into the rear password input unit 20 in the forward direction in a place shared with others to prevent the password from being exposed. In addition, under an environment that the password may not be exposed to others, the user may input the password into the display unit 10 as well as the rear password input unit 20 to set or release the use restriction according to the conveniences of the user.

In this case, when the password input into the display unit 10 is compared with the password input into the rear password input unit 20, the password input into the display unit 10 is matched to a password input in the reverse direction, and symmetrical to a password input in the forward direction.

Accordingly, when the passwords are not only input into the rear password input unit 20 in different directions, but also input into mutually different input sections in setting and releasing the use restriction, that is, when the setting password is input into the display unit 10 and the releasing password is input into the rear password input unit 20, or vice versa, the control unit 500 releases the use restriction when the setting password is matched to or symmetrical to the releasing password, thereby preventing errors, similarly to the second embodiment.

Figure 19:
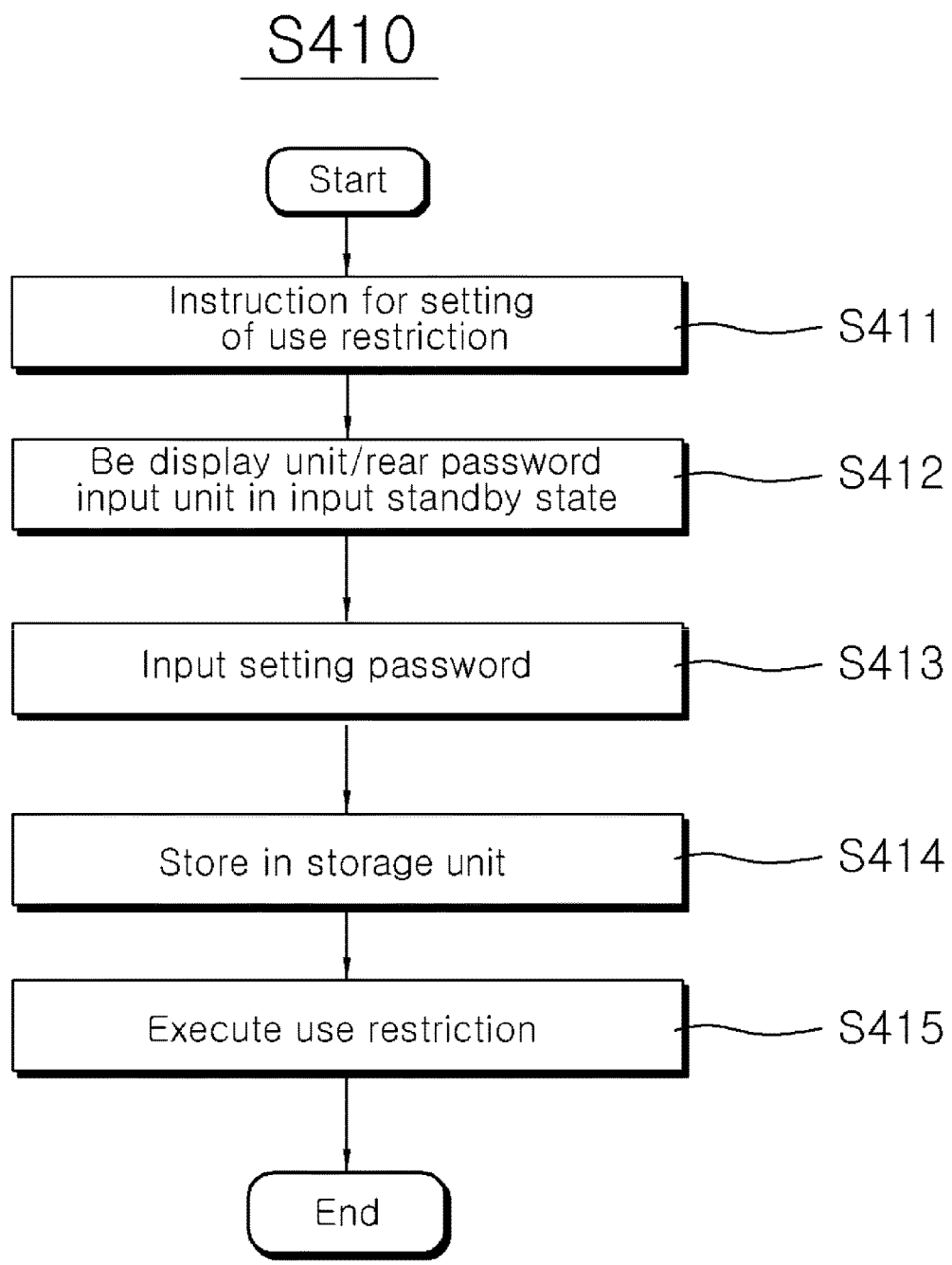
FIG. 19 is a flowchart illustrating the steps of setting the use restriction according to the third embodiment.
Figure 20:
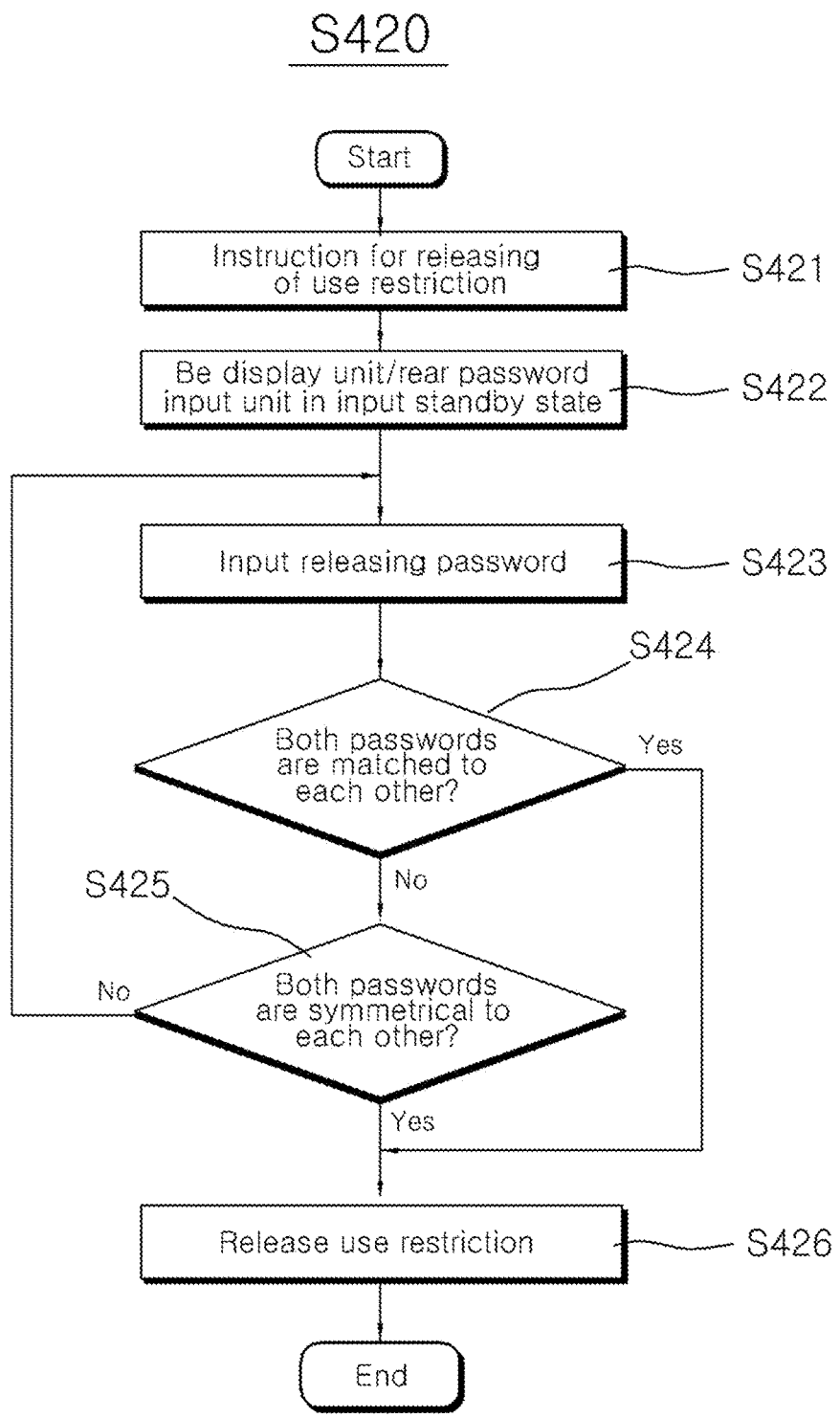
FIG. 20 is a flowchart illustrating the steps of releasing the use restriction according to the third embodiment.

FIGS. 19 and 20 are flowcharts illustrating a method of setting and releasing the use restriction for a portable terminal according to the third embodiment, and the following description will be made while focusing on the difference from the method of setting and releasing the use restriction according to the second embodiment described above.

First, as illustrated in FIG. 19, in a step of setting the use restriction (S410), if an instruction for the setting of the use restriction is input from the user (S411), the control unit 50 controls the display unit 10 and the rear password input unit 20 to be in the input standby state so that the setting password may be input (S412).

Then, any one of the display unit 10 and the rear password input unit 20 selected by the user receives the setting password from the user (S413).

In other words, although inputting the setting password by selecting the rear password input unit 20 under a use environment that the setting password may be exposed to others, the user may input the setting password by randomly selecting any one of the display unit 10 and the rear password input unit 20 according to the convenience of the user under a use environment that the setting password may not be exposed to others at all.

If the setting password is input into any one of the display unit 10 and the rear password input unit 20 selected by the user in step S413, the control unit 50 stores the setting password in the storage unit 40 (S414) and executes the use restriction function of the portable terminal (S415).

Next, in the step of releasing the use restriction (S420) as illustrated in FIG. 20, if the instruction for the releasing of the use restriction is input from the user under the execution of the use restriction function (S421), the control unit 50 controls the display unit 10 and the rear password input unit 20 to be in the input standby state so that the releasing password may be input (S422).

Then, any one of the display unit 10 and the rear password input unit 20 selected by the user receives the releasing password from the user (S423).

In other words, the user may input the releasing password by randomly selecting any one of the display unit 10 and the rear password input unit 20 according to use environments and conveniences of the user, similarly to the case of inputting the setting passwords.

If the releasing password is input into any one of the display unit 10 and the rear password input unit 20 selected by the user, the identity between two passwords is primarily determined by comparing the input releasing password with the stored setting password (S424) and the symmetry between the two passwords is secondarily determined if the two passwords are different from each other (S425).

Subsequently, if the two passwords are determined as being matched to each other according to the determination result in the step S424, the use restriction may be released, and, if the two passwords are determined as being different from each other and symmetrical to each other according to the determination result in the step S425, the use restriction may be released (S426).

Figure 21:
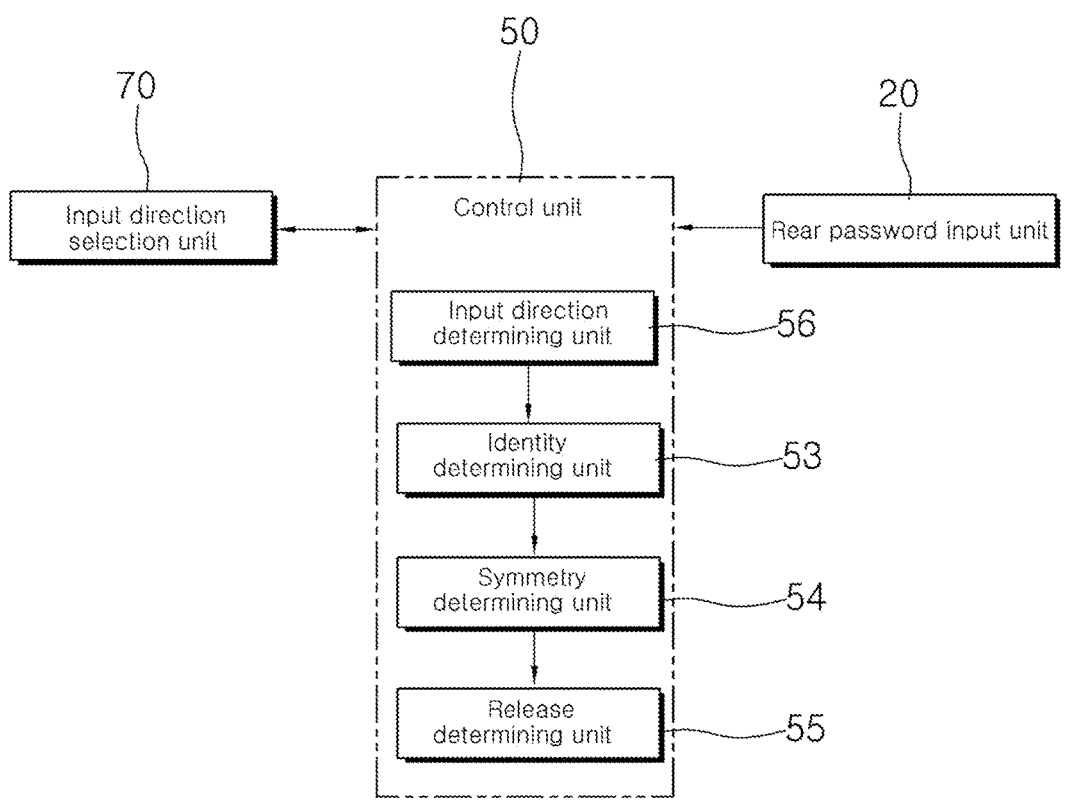
FIG. 21 is a block diagrams illustrating a control unit according to a fourth embodiment.

FIG. 21 is a block diagram illustrating a portable terminal according to the fourth embodiment of the present invention, which has the same configuration as that of the second embodiment described above except that an input direction selection unit 70 is further included, and the control unit 50 is configured to determine the releasing of the use restriction depending on input directions. Accordingly, the following description will be made while focusing on the difference from the second embodiment.

The portable terminal according to the fourth embodiment of the present invention further includes the input direction selection unit 70.

The input direction selection unit 70 receives from the user the selection of whether the setting password or the releasing password is to be input in the forward direction or the reverse direction before the user inputs the setting password or the releasing password into the rear password input unit 20.

To this end, if the setting password or the releasing password is input, the input direction selection unit 70 displays a selection menu for an input direction on the display unit 10 so that the user may select the input direction, and receives from the user the selection of the forward direction or the reverse direction.

Then, if the user inputs the setting password into the rear password input unit 20 in the selected input direction after selecting the input direction in the setting of the use restriction, the control unit 50 stores the input setting password and the selected input direction in the storage unit 40 while executing the use restriction.

In addition, if the user inputs the releasing password into the rear password input unit 20 in the selected input direction after selecting the input direction in the releasing of the use restriction, the control unit 50 determines the releasing of the use restriction by comparing both of the input releasing password and the selected input direction with the stored setting password and the input directions in the setting of the use restriction, respectively.

To this end, the control unit 50 may further include an input direction determining unit 56, the identity determining unit 53, the symmetry determining unit 54, and the release determining unit 55.

The input direction determining unit 56 compares the input direction in the setting of the use restriction, which is stored in the storage unit 40, with the input direction selected in the releasing of the use restriction to determine if two input directions are identical to each other.

The identity determining unit 53 compares the releasing password input in the releasing of the use restriction with the setting password stored in the storage unit 40 to determine the identity between two passwords.

The symmetry determining unit 54 compares the releasing password input in the releasing of the use restriction with the stored setting password to determine the symmetry between two passwords.

The release determining unit 55 releases the use restriction if the identity determining unit 53 determines the releasing password as being matched to the setting password, on the assumption that the input direction determining unit 56 determines the two input directions as being identical to each other, that is, that both of the input directions in the setting and the releasing of the use restriction are identical to each other as the forward direction or the reverse direction.

In addition, the release determining unit 55 releases the use restriction if the symmetry determining unit 54 determines the releasing password as being symmetrical to the setting password, on the assumption that the input direction determining unit 56 determines the two input directions as being different from each other, that is, on the assumption that the direction in the setting of the use restriction is the forward direction but the direction in the releasing of the use restriction is the reverse direction, or the direction in the setting of the use restriction is the reverse direction, but the direction in the releasing of the use restriction is the forward direction.

Figure 22:
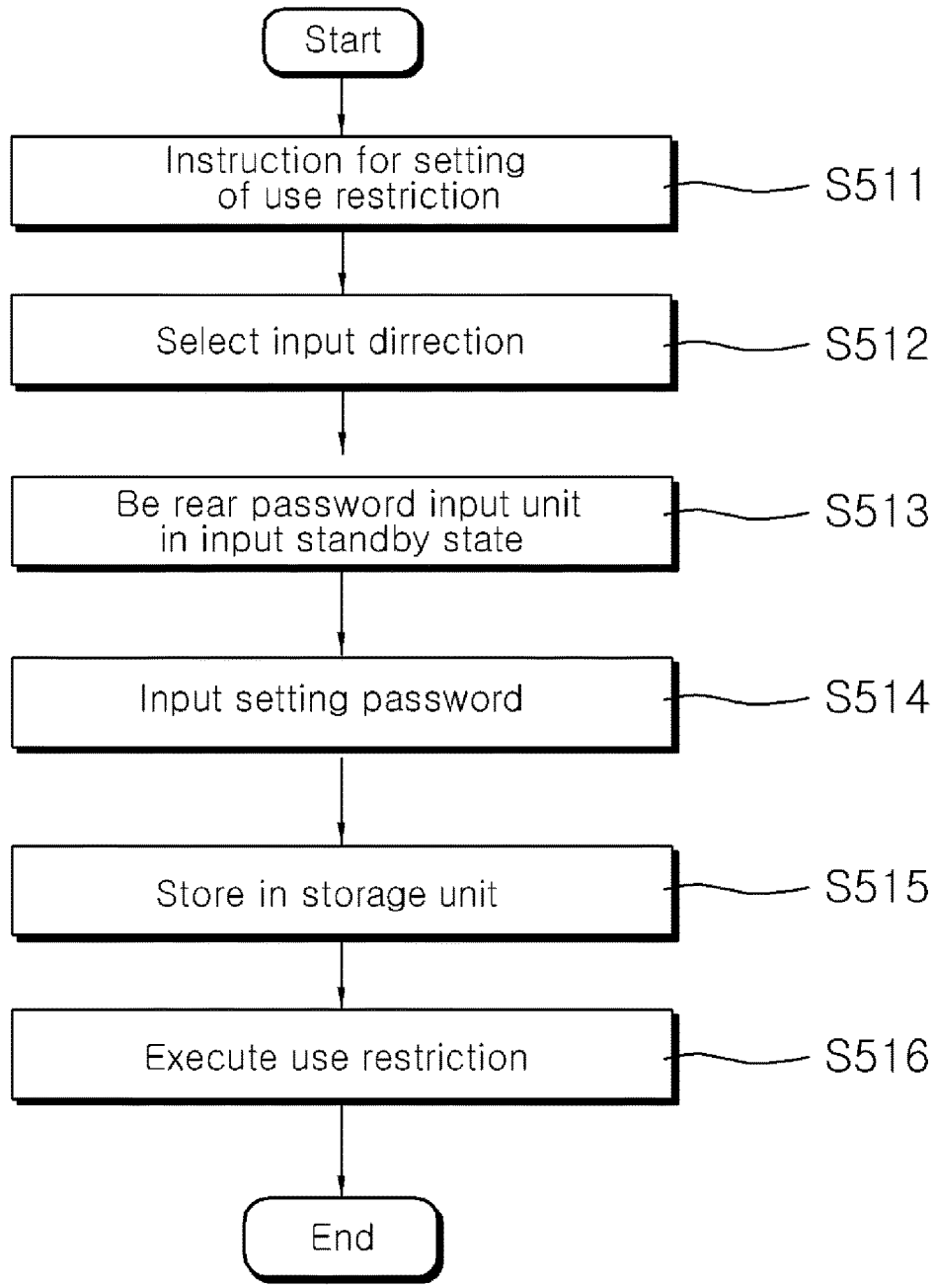
FIG. 22 is a flowchart illustrating the steps of setting the use restriction according to the fourth embodiment.
Figure 23:
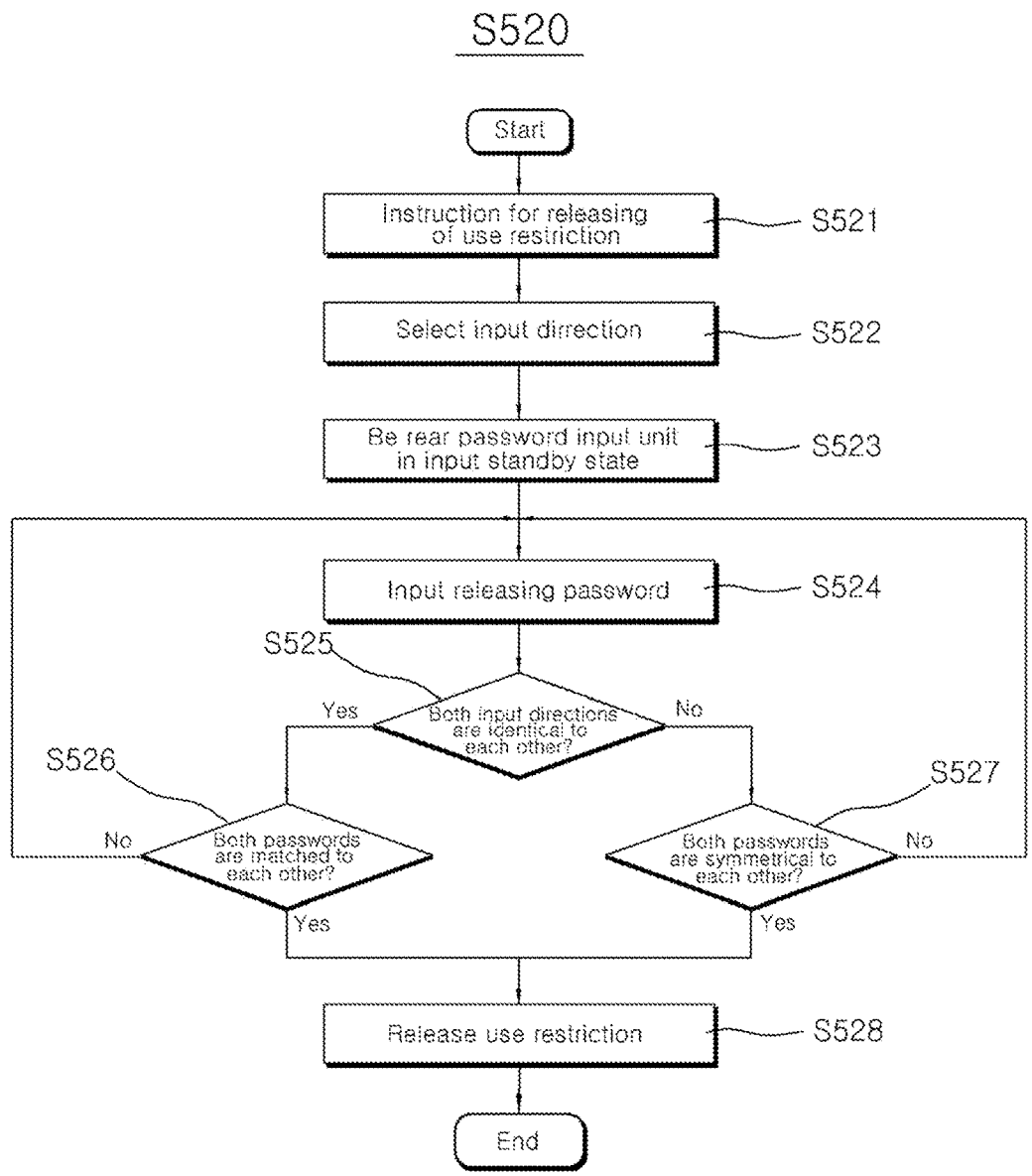
FIG. 23 is a flowchart illustrating the steps of releasing the use restriction according to the fourth embodiment.

FIGS. 22 and 23 are flowcharts illustrating a method of setting and releasing use restriction for the portable terminal according to the fourth embodiment. The following description will be made while focusing on the difference from the method of setting and releasing the use restriction according to the second embodiment.

First, as illustrated in FIG. 22, in a step of setting the use restriction (S510), if an instruction for the setting of the use restriction is input from the user (S511), the input direction selection unit 70 receives from the user the selection of whether the setting password is to be input in the forward direction or the reverse direction after displaying the selection menu for the input direction of the rear password input unit 20 on the display unit 10 (S512).

In other words, although the user must select the forward direction to prevent the password from being exposed under the situation that may expose the password, the user may freely select the forward direction or the reverse direction according to the conveniences of the user under the situation that may not expose the password.

If the input direction is selected from the user, the control unit 50 controls the rear password input unit 20 to be in the input standby state so that the setting password may be input (S513), and the rear password input unit 20 receives the setting password from the user (S514).

In this case, the user inputs the setting password into the rear password input unit 20 according to the input direction selected by the user. That is to say, the user inputs the setting password into the rear password input unit 20 while gripping the portable terminal normally if selecting the forward direction, but inputs the setting password into the rear password input unit 20 while gripping the overturned portable terminal if selecting the reverse direction.

Then, if the setting password is input into the rear password input unit 20 in the selected input direction, the control unit 50 stores the input setting password and the selected input direction (that is, the forward direction or the reverse direction) into the storage unit 40 (S515) and executes the use restriction function of the portable terminal (S516).

Next, in the step of releasing the use restriction (S520) as illustrated in FIG. 23, if the instruction for the releasing of the use restriction is input from the user (S521), the input direction selection unit 70 receives from the user the selection of an input direction that the releasing password is to be input after displaying the selection menu for the input direction of the rear password input unit 20 on the display unit 10 (S522).

Then, if the input direction of the releasing password is selected by the user, the control unit 50 controls the rear password input unit 20 to be in the input standby state so that the releasing password may be input (S523), and the rear password input unit 20 receives the releasing password from the user (S524).

Similarly, it is natural that the user should input the releasing password while gripping the portable terminal corresponding to the input direction selected by the user.

If the releasing password is input into the rear password input unit 20 in the selected input direction, the control unit 50 compares the input direction selected in the releasing of the use restriction with the stored input direction in the setting of the use restriction to determine the identity between two input directions (S525).

Then, if the two input directions are determined as being identical to each other according to the determination result in step S525, it is determined if the input releasing password and the stored setting password are matched to each other (S526). If the two input directions are determined as being different from each other, it is determined if the input releasing password and the stored setting password are symmetrical to each other (S527).

Then, if the releasing password and the setting password are determined as being matched to each other in step S526, or symmetrical to each other in step S527, the use restriction is released (S528).

Figure 24:
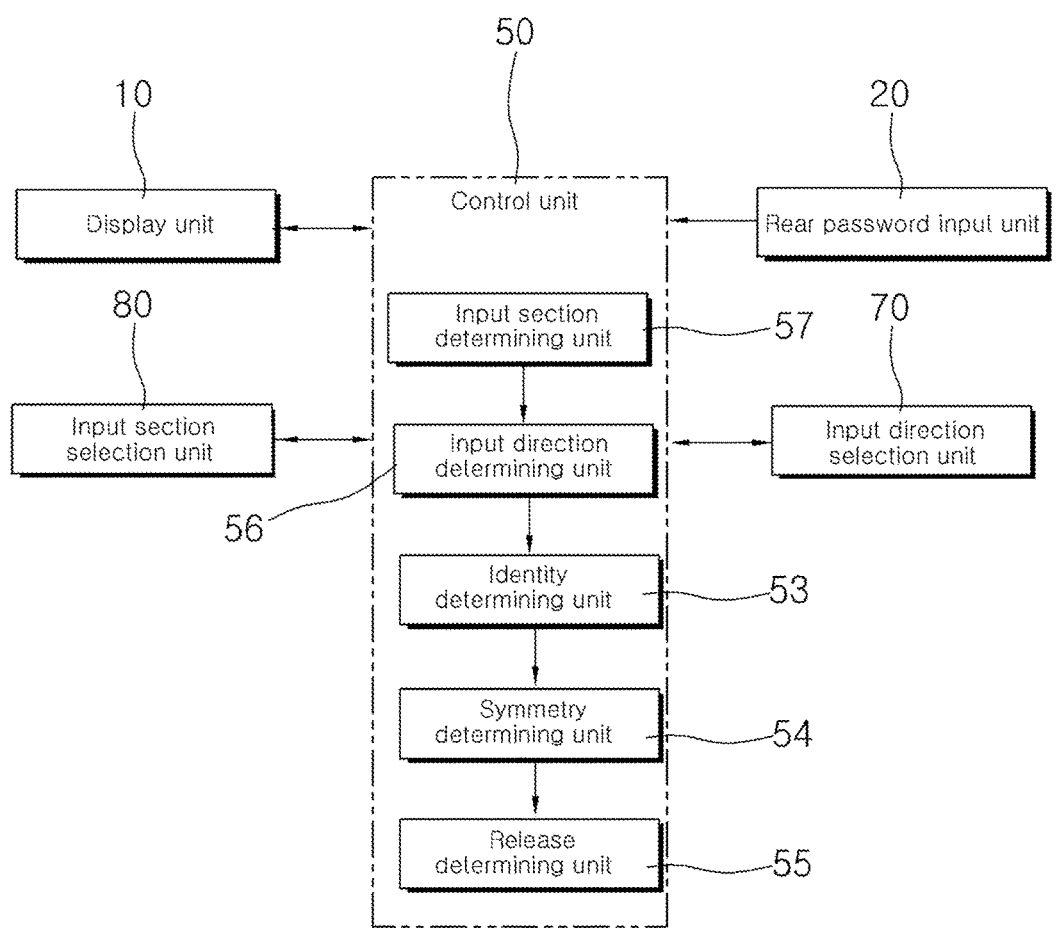
FIG. 24 is a block diagrams illustrating a control unit according to a fifth embodiment.

FIG. 24 is a block diagram illustrating a portable terminal according to a fifth embodiment of the present invention, which has the same configuration as that of the fourth embodiment except that the setting password or the releasing password for the use restriction is input into the display unit 10 as well as the rear password input unit 20.

The portable terminal according to the forth embodiment of the present invention further includes an input section selection unit 80. The input section selection unit 80 receives from the user the selection of one of the display unit 10 and the rear password input unit 20 to input the setting password or the releasing password.

To this end, the input section selection unit 80 displays a selection menu for input sections on the display unit 10 so that the user may select the input section if the setting password or the releasing password is input, and receives from the user the selection of the display unit 10 or the rear password input unit 20.

In other words, although the user may input the setting password by selecting the rear password input unit 20 as the input section under the situation that may expose the password, the user may select one of the display unit 10 and the rear password input unit 20 as the input section according to the conveniences of the user under the situation that may not expose the password.

In addition, the input direction selection unit 70 receives the selection of the input direction of the rear password input unit 20. Accordingly, different from the fourth embodiment described above, the input direction selection unit 70 may be configured to be activated only if the user selects the rear password input unit 20 as the input section through the input section selection unit 80.

Further, if the user selects the input section in the setting of the use restriction, selects the input direction, and inputs the setting password into the display unit 10 or the rear password input unit 20 according to the selected input section and the selected input direction, the control unit 50 stores the selected input section (that is, the display unit 10 or the rear password input unit 20) and the selected input direction (naturally, when the rear password input unit 20 is selected as the input section) in the storage unit 40 together with the input setting password while executing the use restriction.

If the user selects the input section and the input direction in the releasing of the use restriction, and inputs the setting password into the display unit 10 or the rear password input unit 20 according to the selected input section and the selected input direction, the control unit compares the input releasing password, and the input section and the input direction in the releasing of the use restriction with the stored setting password, and the input section and the input direction in the setting of the password to determine the releasing of the use restriction.

To this end, the control unit 50 may further include an input section determining unit 57, the input direction determining unit 56, the identity determining unit 53, the symmetry determining unit 54, and the release determining unit 55.

The input section determining unit 57 compares the input section in the setting of the use restriction, which is stored in the storage unit 40, with the input section selected in the releasing of the use restriction to determine if two input section are identical to each other, and to determine whether the selected input section is the display unit 10 or the rear password input unit 20.

If the rear password input unit 20 is selected as the input section, the input direction determining unit 56 compares the input direction in the setting of the use restriction, which is stored in the storage unit 40, with the input direction selected in the releasing of the use restriction to determine if the two input directions are identical to each other, and to determine an input direction selected from both of the forward direction and the reverse direction.

The identity determining unit 53 and the symmetry determining unit 54 determine the identity and the symmetry between two passwords, respectively, in the same manners as those of the above embodiments.

The release determining unit 55 releases the use restriction according to the determination results in the input section determining unit 57, the input direction determining unit 56, the identity determining unit 53, and the symmetry determining unit 54.

In detail, the release determining unit 55 releases the use restriction if the releasing password and the setting password are determined as being matched to each other by the identity determining unit 53 in the first case that both of two input sections in the releasing and setting of the use restriction are determined as being identical to each other as the display unit 10 by the input section determining unit 57, the second case that two input directions of the rear password input unit 20 in the releasing and the setting of the use restriction are determined as being identical to each other by the input direction determining unit 56 on the assumption that both of two input sections in the releasing and the setting of the use restriction are determined as being identical to each other as the rear password input unit 20 by the input section determining unit 57, and the third case that the input direction of the rear password input unit 20 is determined as being the reverse direction by the input direction determining unit 56 on the assumption that the two input sections in the releasing and the setting of the use restriction are determined as being different from each other by the input section determining unit 57.

In addition, the release determining unit 55 releases the use restriction if the releasing password and the setting password are determined as being symmetrical to each other by the symmetry determining unit 54 in the first case that two input directions of the rear password input unit 20 in the releasing and the setting of the use restriction are determined as being different from each other by the input direction determining unit 56 on the assumption that both of two input sections in the releasing and the setting of the use restriction are determined as being identical to each other as the rear password input unit 20 by the input section determining unit 57, and the second case that the input direction of the rear password input unit 20 is determined as being the forward direction by the input direction determining unit 56 on the assumption that the two input sections in the releasing and the setting of the use restriction are determined as being different from each other by the input section determining unit 57.

Figure 25:
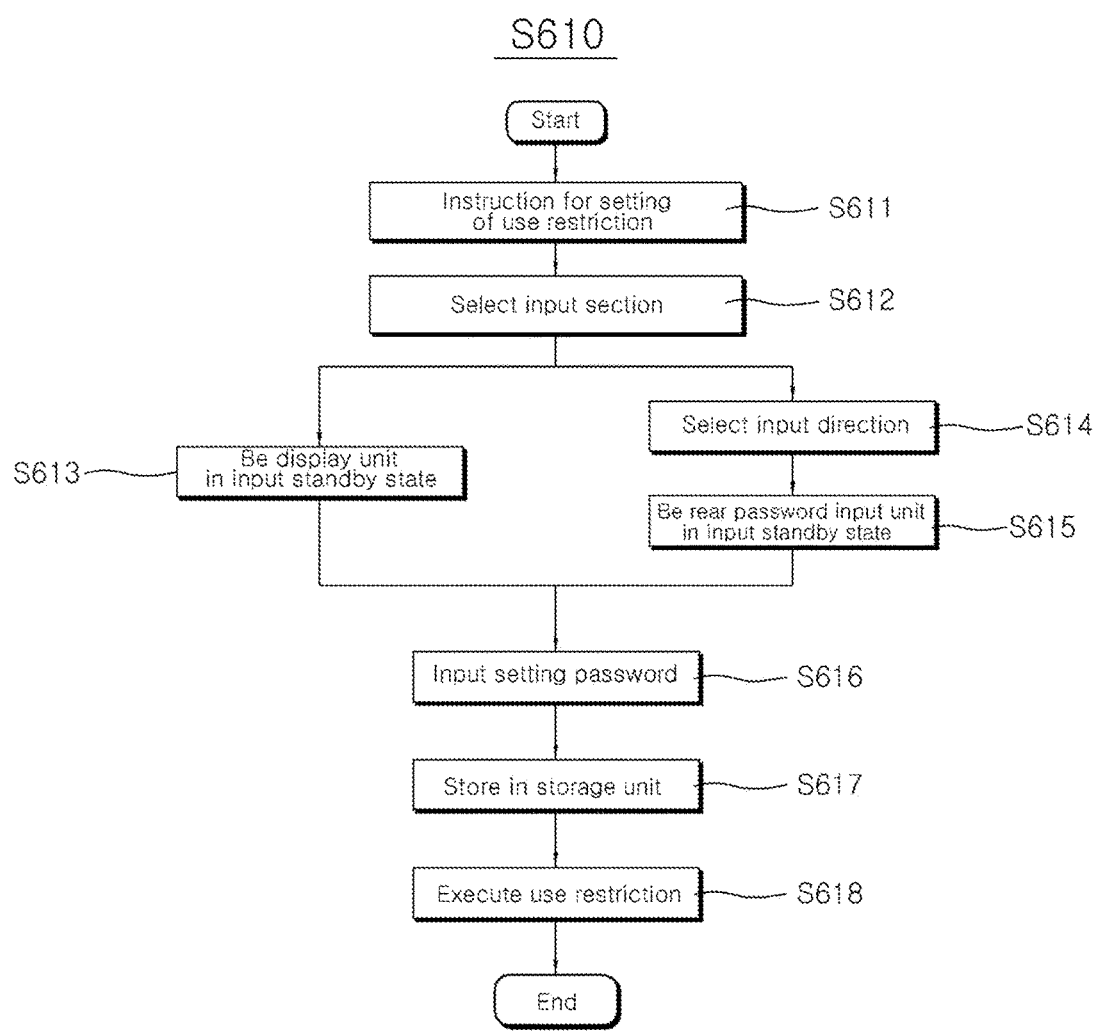
FIG. 25 is a flowchart illustrating the steps of setting the use restriction according to the fifth embodiment.
Figure 26:
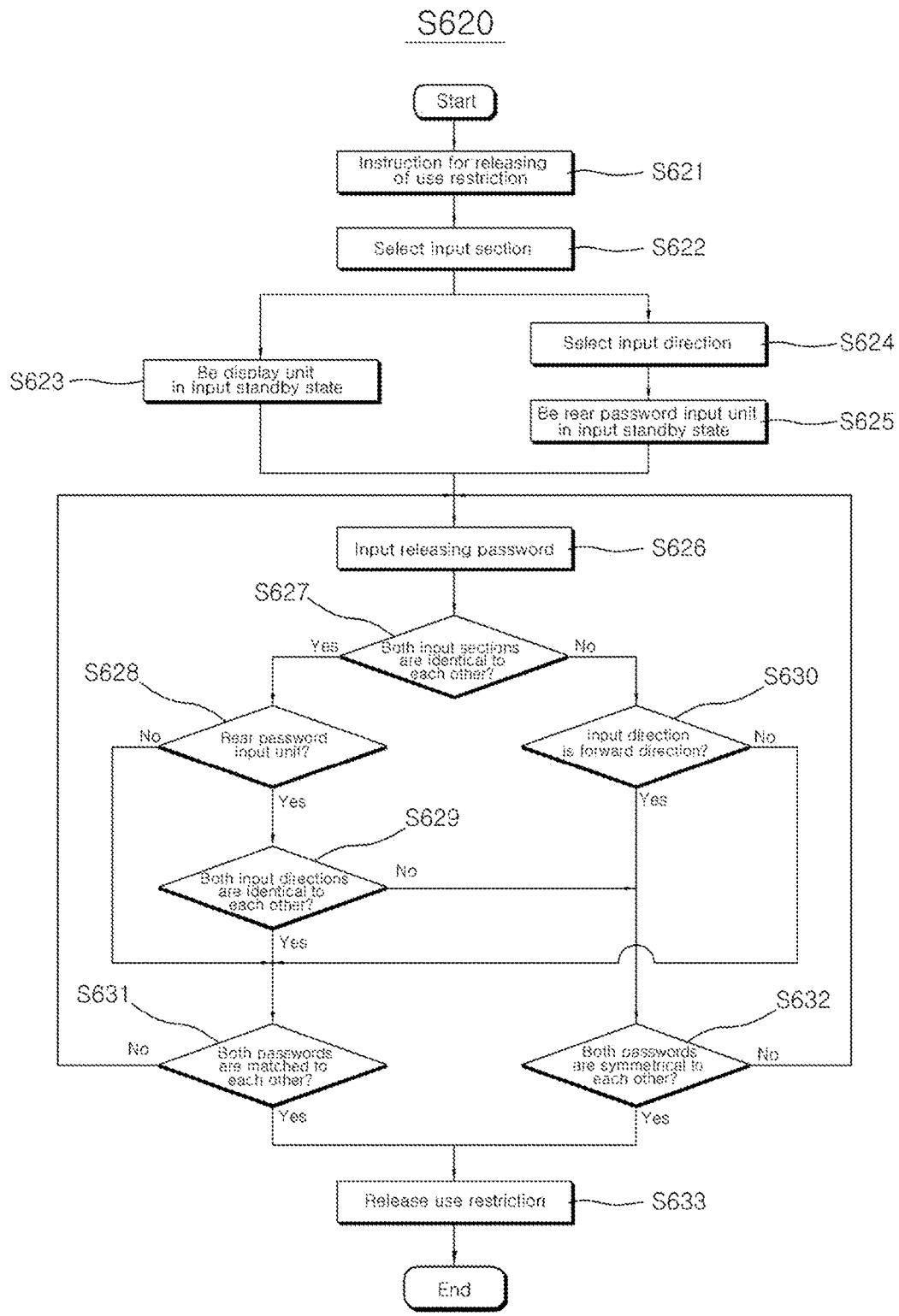
FIG. 26 is a flowchart illustrating the steps of releasing the use restriction according to the fifth embodiment.

FIGS. 25 and 26 are flowcharts illustrating a method of setting and releasing the use restriction for the portable terminal according to the fifth embodiment.

First, as illustrated in FIG. 25, in a step of setting the use restriction (S610), if an instruction for the setting of the use restriction is input from the user (S611), the input section selecting unit 80 receives the selection of an input section from the user after displaying the selection menu for the input section on the display unit 10 so that the user may select the display unit 10 or the rear password input unit 20 as the input section (S612).

If the display unit 10 is selected as the input section in step S612, the control unit 50 controls the display unit 10 to be in the input standby state (S613).

In addition, if the rear password input unit 20 is selected as the input section, the control unit 50 operates the input direction selection unit 70 to receive from the user the selection of the input direction of the rear password input unit 20 (S614) and then controls the rear password input unit 20 to be in the input standby state (S615).

In other words, although the user must select the rear password input unit 20 as the input section and the forward direction as the input direction to prevent the password from being exposed under the situation that may expose the password according to the use environments, the user may select the display unit 10 or the rear password input unit 20 while selecting the reverse direction as the input direction according to the conveniences of the user under the situation that may not expose the password.

If the input section and the input direction are selected as described above, the display unit 10 or the rear password input unit 20 selected by the user receives the setting password from the user (S616).

Then, if the setting password is input according to the selected input section and the input direction, the control unit 50 stores the input setting password, the selected input section (that is, the display unit 10 or the rear password input unit 20), and the selected input direction (that is, the forward direction or the reverse direction when the input section is the rear password input unit 20) in the storage unit 40 (S617) and executes the use restriction function of the portable terminal (S618).

Next, in the step of releasing the use restriction (S620) as illustrated in FIG. 26, if the instruction for the releasing of the use restriction is input from the user (S621), the input section selection unit 80 receives from the user the selection of an input section of the releasing password after displaying the selection menu for the input section on the display unit 10 (S622).

If the display unit 10 is selected as the input section in step S622, the control unit 50 controls the display unit 10 to be in the input standby state (S623), and, if the rear password input unit 20 is selected as the input section in step S622, the control unit 50 operates the input direction selection unit 70 to receive from the user the selection of the input direction of the rear password input unit 20 and then controls the rear password input unit 20 to be in the input standby state (S625).

Next, if the input section and the input directions are selected as described above, the display unit 10 or the rear password input unit 20 selected by the user receives the releasing password from the user (S626).

Subsequently, if the releasing password is input as described, the control unit 50 determines if the input section selected in the releasing of the use restriction is identical to the input section selected in the setting of the use restriction (S627).

Then, if two input sections are determined as being identical to each other according to the determination result in step S627, it is determined if the two input sections identical to each other correspond to the display unit 10 or the rear password input unit 20 (S628).

In addition, if the two input sections identical to each other correspond to the rear password input unit 20 according to the determination result in step S628, it is determined if the input direction selected in the releasing of the use restriction and the stored input direction in the setting of the use restriction are identical to each other (S629)

Meanwhile, if the two input sections are determined as being different from each other according to the determination result in step S627, it is determined whether the input direction in the setting or the releasing of the use restriction with respect to the rear password input unit of both input sections is the forward direction or the reverse direction (S630).

Then, it is determined if the input releasing password and the stored setting password are matched to each other (S631) based on the determinations in the above steps, in detail, on the assumption that the two identical input sections are determined as corresponding to the display unit 10 according to the determination result in step S628, that the two input directions in the releasing and the setting of the use restriction are determined as being identical to each other according to the determination result in step S629, and that the input direction of the rear password input unit 20 is determined as being the reverse direction according to the determination result in step S630.

In addition, it is determined if the input releasing password and the stored setting password are symmetrical to each other (S632) on the assumption that the two input directions in the releasing and the setting of the use restriction are determined as being different from each other according to the determination result in step S629 and that the input direction of the rear password input unit 20 is determined as being the reverse direction according to the determination result in step S630.

The use restriction is released (S633) if the releasing password and the setting password are determined as being matched to each other according to the determination result in step S631, or if the releasing password and the setting password are determined as being symmetrical to each other according to the determination result in step S632.

Figure 27:
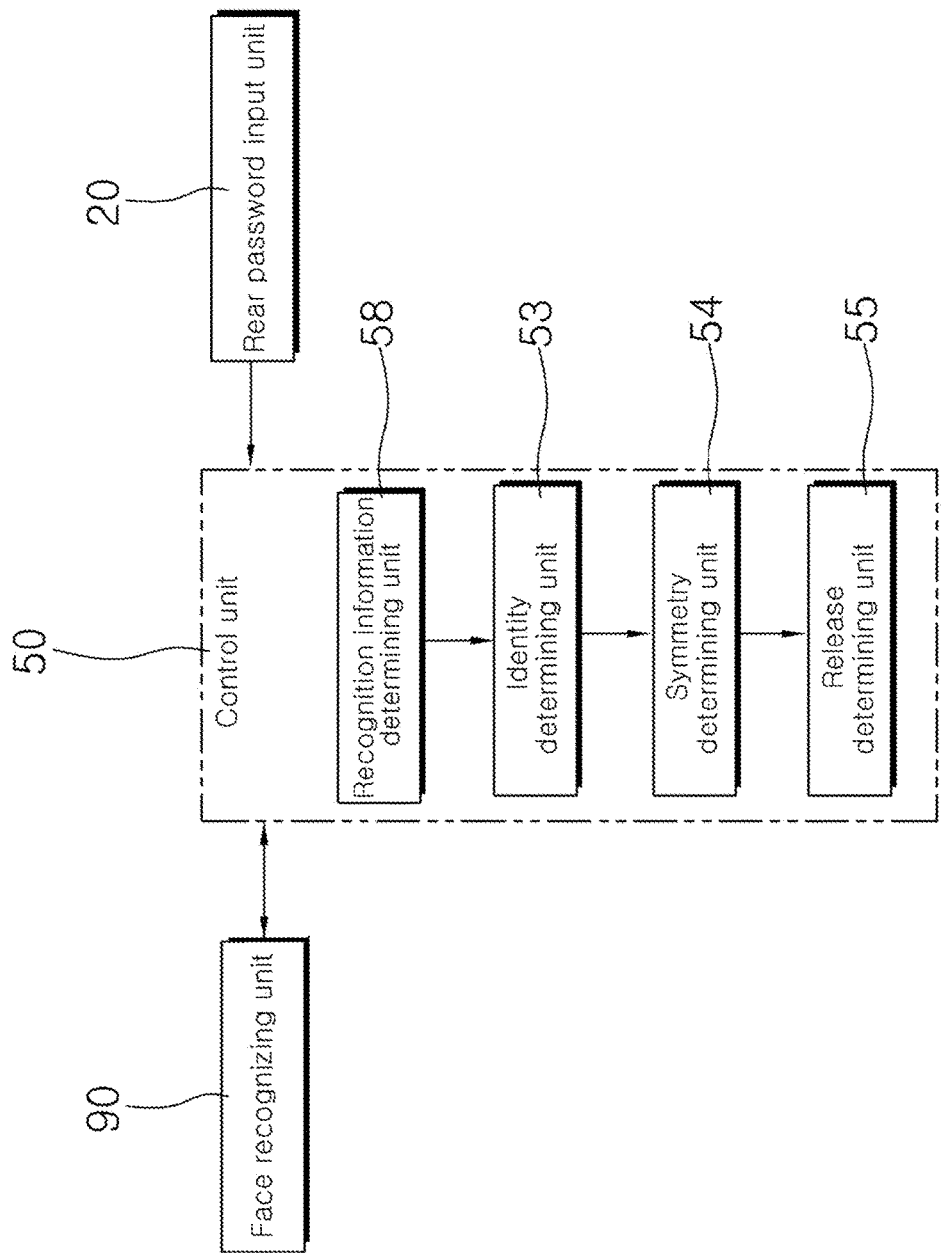
FIG. 27 is a block diagrams illustrating a control unit according to a sixth embodiment.

FIG. 27 is a block diagram illustrating a portable terminal according to the sixth embodiment of the present invention, which has the same configuration as that of the second embodiment described above except that a face recognizing unit 90 is further included, and the control unit 50 is configured to variously determine the releasing of the use restriction depending on face recognition states.

The portable terminal according to the present sixth embodiment further includes the face recognizing unit 90, and the face recognizing unit 90 recognizes the facial contour of the user through an entire surface of a body of the portable terminal when the setting password or the releasing password is input into the rear password input unit 20 to create information on the face recognition states.

Since the technologies to realize the functions of the face recognizing unit 90 are disclosed in various prior arts including Korean Patent Registration Nos. 10-1000130 and 10-0901125, well known in the art, to which the invention pertains, and variously applied to typical portable terminals, the details thereof will be omitted below.

In this case, the recognition information of the face recognizing unit 90 is related to the input direction of the rear password input unit 20. In other words, the face of the user is recognized when the setting password or the releasing password is input into the rear password input unit 20, which refers to that the setting password or the releasing password is input in the forward direction. On the contrast, the face of the user is not recognized when the setting password or the releasing password is input into the rear password input unit 20, which refers to that the setting password or the releasing password is input in the reverse direction.

In addition, if the setting password is into the rear password input unit 20, the control unit 50 stores the input setting password and the recognition information on the face recognition states, which is created by the face recognizing unit 90, in the storage unit 40 to execute the use restriction.

In addition, if the releasing password is input into the rear password input unit 20 in the releasing of the use restriction, the control unit 50 compares the input releasing password, and the recognition information on the face recognition states, which is created by the face recognizing unit 90 in the releasing of the use restriction, with the stored setting password and the recognition information when the setting password is input, respectively, to determine the releasing of the use restriction.

To this end, the control unit 50 further includes a recognition information determining unit 58, the identity determining unit 53, the symmetry determining unit 54, and the release determining unit 55.

The recognition information determining unit 58 compares the recognition information in the setting of the use restriction, which is stored in the storage unit 40, with the recognition information in the releasing of the use restriction to determine if two pieces of recognition information are matched to each other.

The identity determining unit 53 and the symmetry determining unit 54 compare the stored setting password with the releasing password input in the releasing of the use restriction to determine the identity and the symmetry between two passwords, respectively.

The release determining unit 55 releases the use restriction if the releasing password and the setting password are determined as being matched to each other by the identity determine unit 53 on the assumption that two pieces of recognition information are determined as being matched to each other by the recognition information determining unit 58, that is, both pieces of the recognition information created in the setting and the releasing of the use restriction are determined as being face recognition information obtained by recognizing the face of the user or non-recognition information.

In addition, the release determining unit 55 releases the use restriction if the releasing password and the setting password are determined as being symmetrical to each other by the symmetry determining unit 54 on the assumption that the two pieces of recognition information are determined as being different from each other by the recognition information determining unit 58, that is, on the assumption that the face recognition information is created in the setting of the use restriction, and non-recognition information is created in the releasing of the use restriction, or the non-recognition information is created in the setting of the use restriction, and the face recognition information is created in the releasing of the use restriction.

Figure 28:
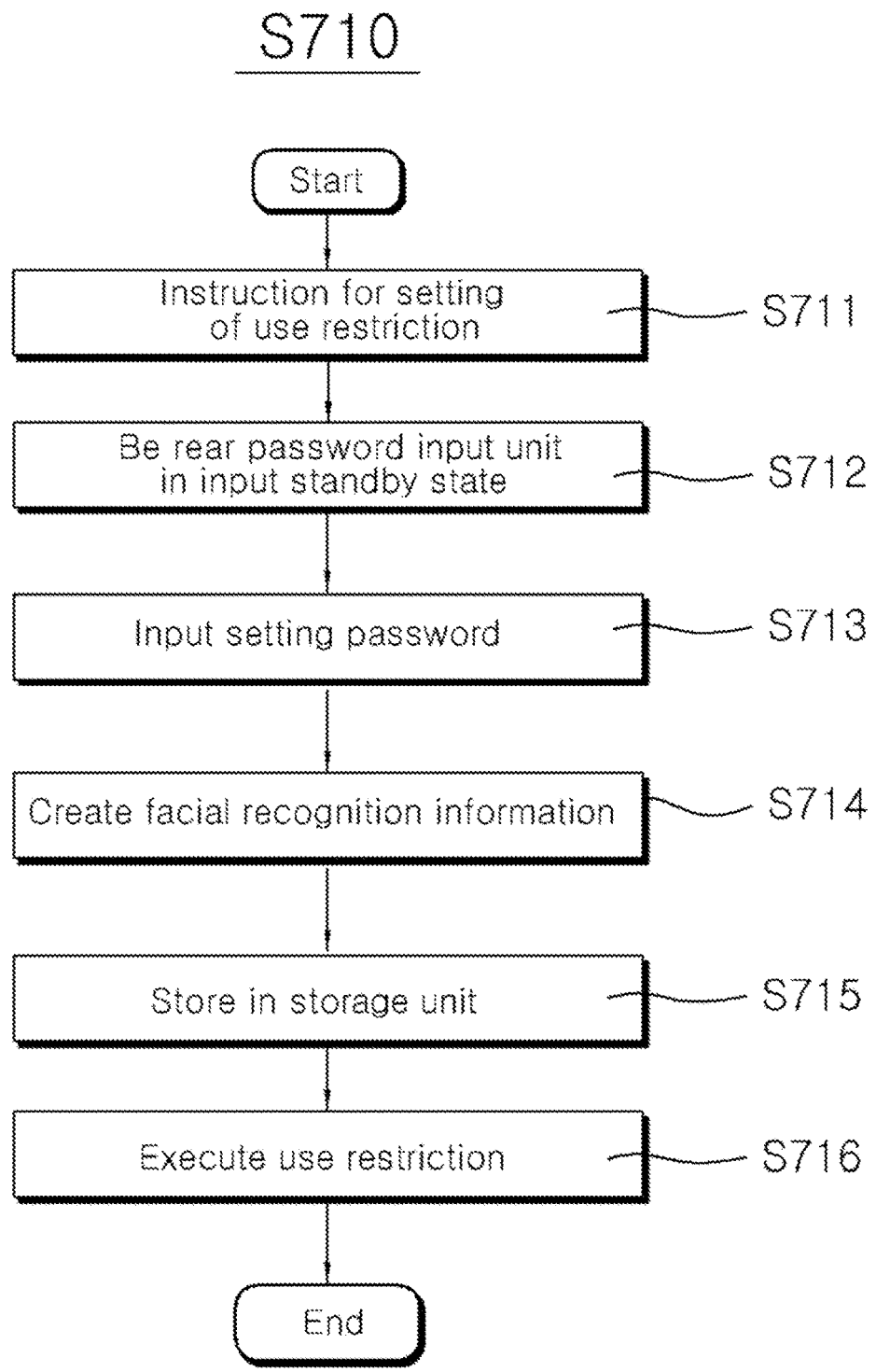
FIG. 28 is a flowchart illustrating the steps of setting the use restriction according to the sixth embodiment.
Figure 29:
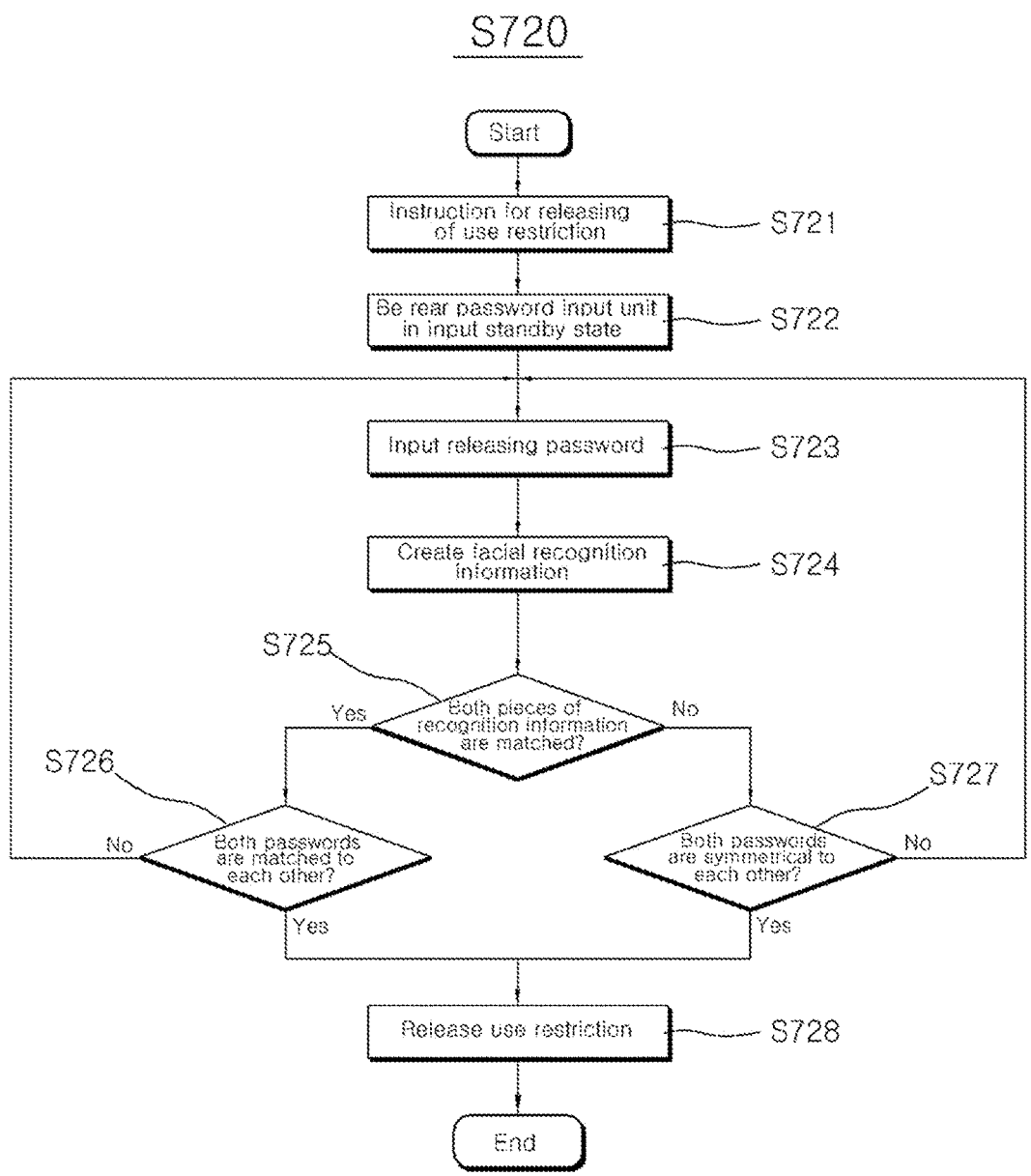
FIG. 29 is a flowchart illustrating the steps of releasing the use restriction according to the sixth embodiment.

FIGS. 28 and 29 are flowcharts illustrating a method of setting and releasing the use restriction for the portable terminal according to the sixth embodiment.

First, as illustrated in FIG. 28, in a step of setting the use restriction (S710), if an instruction for the setting of the use restriction is input from the user (S711), the control unit 50 controls the rear password input unit 20 to be in the input standby state (S712), and the rear password input unit 20 receives the setting password from the user (S713).

Then, when the setting password is input as described above, the face recognizing unit 90 creates the recognition information on the face recognition states of the user under the control of the control unit 50 (S714).

In this case, the created recognition information becomes face recognition information obtained by recognizing the face if the user inputs the setting password in the forward direction, but a non-recognition information of the face if the user inputs the setting password in the reverse direction.

If the setting password is input into the rear password input unit 20 as described above, the control unit stores the input setting password and the recognition information created in the setting of the use restriction into the storage unit 40 (S715) and executes the use restriction function of the portable terminal (S716).

Next, in the step of releasing the use restriction (S720) as illustrated in FIG. 29, if the instruction for the releasing of the use restriction is input from the user (S721), the control unit 50 controls the rear password input unit 20 to be in the input standby state (S722), and the rear password input unit 20 receives the releasing password from the user (S723).

Then, when the releasing password is input described above, the face recognizing unit 90 creates the recognition information on the face recognition states of the user under the control of the control unit 50 (S724).

If the releasing password is input into the rear password input unit 20 as described above, the control unit compares the recognition information created in the releasing of the use restriction with the stored recognition information in the setting of the use restriction to determine if the two pieces of recognition information are matched to each other (S725).

In addition, if the two pieces of recognition information are determined as being matched to each other according to the determination result in step S725, it is determined if the input releasing password and the stored setting password are matched to each other (S726). If the two pieces of recognition information are determined as being different from each other, it is determined if the input releasing password and the stored setting password are symmetrical to each other (S727).

Further, if the releasing password and the setting password are determined as being matched to each other in step S726, or if the releasing password and the setting password are determined as being symmetrical to each other in step S727, the use restriction is released (S728).

Figure 30:
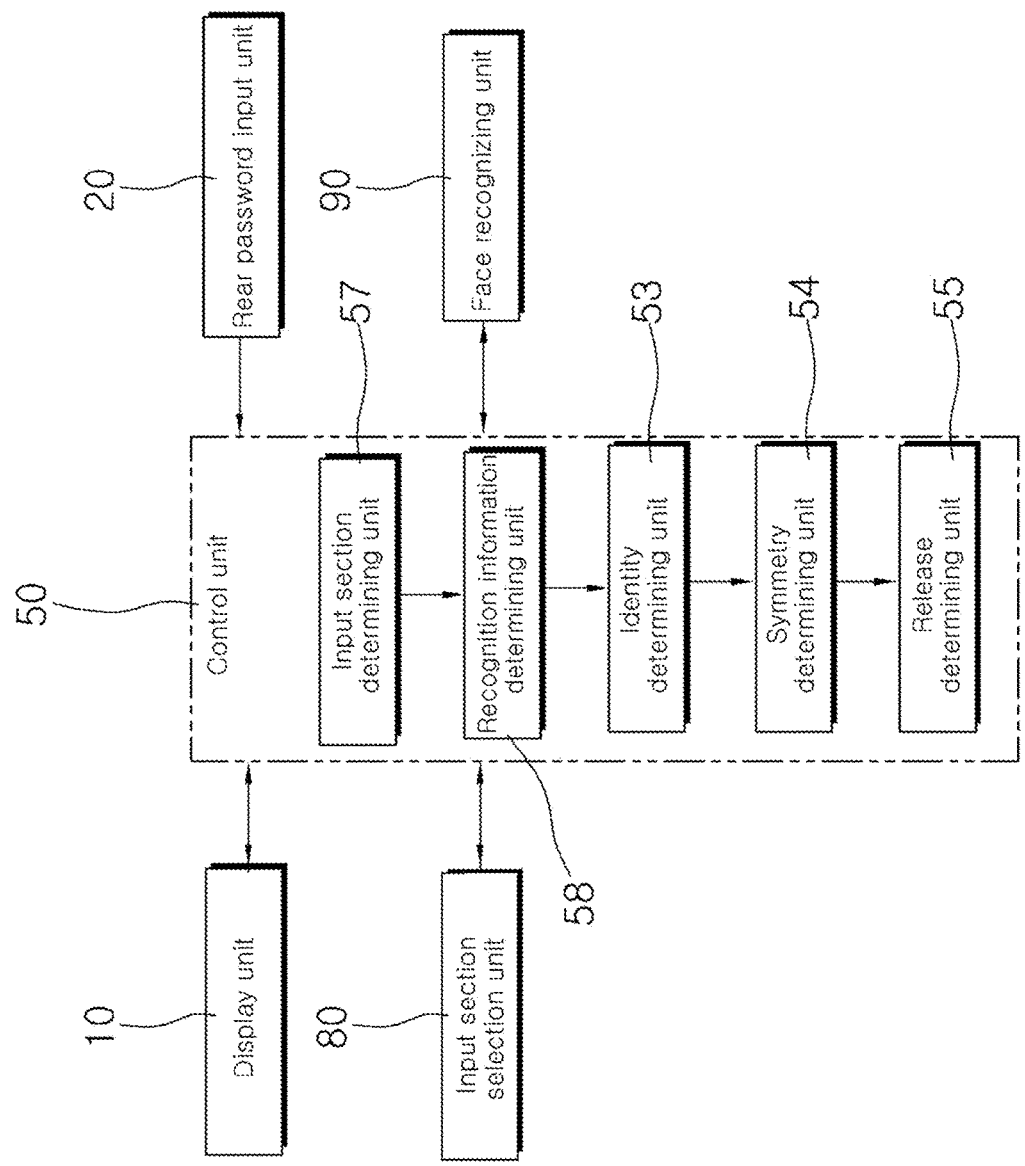
FIG. 30 is a block diagrams illustrating a control unit according to a seventh embodiment.

FIG. 30 is a block diagram illustrating a portable terminal according to a seventh embodiment of the present invention, which has the same configuration as that of the sixth embodiment except that the setting password or the releasing password for the use restriction is input into the display unit 10 as well as the rear password input unit 20.

The portable terminal according to the seventh embodiment of the present invention further includes the input section selection unit 80, and the input section selection unit 80 receives from the user the selection of one of the display unit 10 and the rear password input unit 20 to input the setting password or the releasing password, similarly to the fifth embodiment.

In addition, the face recognizing unit 90 is a section to determine the input direction of the rear password input unit 20. Accordingly, different from the sixth embodiment described above, the face recognizing unit may be configured to be activated only if the user selects the rear password input unit 20 as the input section through the input section selection unit 80.

In addition, if the user inputs the setting password through the selected input section in the setting of the use restriction, the control unit 50 stores the input setting password, the selected input section, and the recognition information created by the face recognizing unit 90 (naturally, when the rear password input unit 20 is selected as the input section) in the storage unit 40 to execute the use restriction.

In addition, if the user inputs the releasing password into the selected input section in the releasing of the use restriction, the control unit 50 compares the input releasing password, the input section in the releasing of the use restriction, and the recognition information created in the releasing of the use restriction with the stored setting password, the input section in the setting of the use restriction, and the recognition information created in the setting of the use restriction, respectively, to determine the releasing of the use restriction.

To this end, the control unit 50 may further include the input section determining unit 57, the recognition information determining unit 58, the identity determining unit 53, the symmetry determining unit 54, and the release determining unit 55.

The input section determining unit 57 compares the input section in the setting of the use restriction, which is stored in the storage unit 40, with the input section selected in the releasing of the use restriction to determine if two input sections are identical to each other, and to determine if the selected input section is the display unit 10 or the rear password input unit 20.

If the rear password input unit 20 is the input section, the recognition information determining unit 58 compares the recognition information in the setting of the use restriction, which is stored in the storage unit 40, with the recognition information in the releasing of the use restriction to determine if two pieces of recognition information are matched to each other and to determine if the two pieces of recognition information are obtained by recognizing the face of the user.

The identity determining unit 53 and the symmetry determining unit 54 determine the identity and the symmetry between two passwords, respectively, similarly the above-described embodiments.

The release determining unit 55 releases the use restriction according to the determination results by the input section determining unit 57, the recognition information determining unit 58, the identity determining unit 53, and the symmetry determining unit 54.

In detail, the release determining unit 55 releases the use restriction if the releasing password and the setting password are determined as being matched to each other by the identity determining unit 53 in the first case that two input sections in the setting and the releasing of the use restriction are determined as being identical to each other as the display unit 10 by the input section determining unit 57, the second case that the two input sections in the setting and the releasing of the use restriction are determined as being identical to each other as the rear password input unit 20 by the input section determining unit 57, and the two pieces of recognition information in the setting and the releasing of the use restriction are determined as being matched to each other by the recognition information determining unit 58, and the third case that two input sections in the setting and the releasing of the use restriction are determined as being different from each other by the input section determining unit 57 and the recognition information is determined as not being the face recognition information of the user by the recognition information determining unit 58.

In addition, the release determining unit 55 release the use restriction if the releasing password and the setting password are determined as being symmetrical to each other by the symmetry determining unit 54 in the first case that the two input sections in the setting and the releasing of the use restriction are determined as being identical to each other as the rear password input unit 20 by the input section determining unit 57 and the two pieces of recognition information in the setting and the releasing of the use restriction are determined as being different from each other by the recognition information determining unit 58, and the second case that the two input sections in the setting and the releasing of the use restriction are determined as being different from each other by the input section determining unit 57, and the recognition information is determined as being obtained by recognizing the face of the user by the recognition information determining unit 58.

Figure 31:
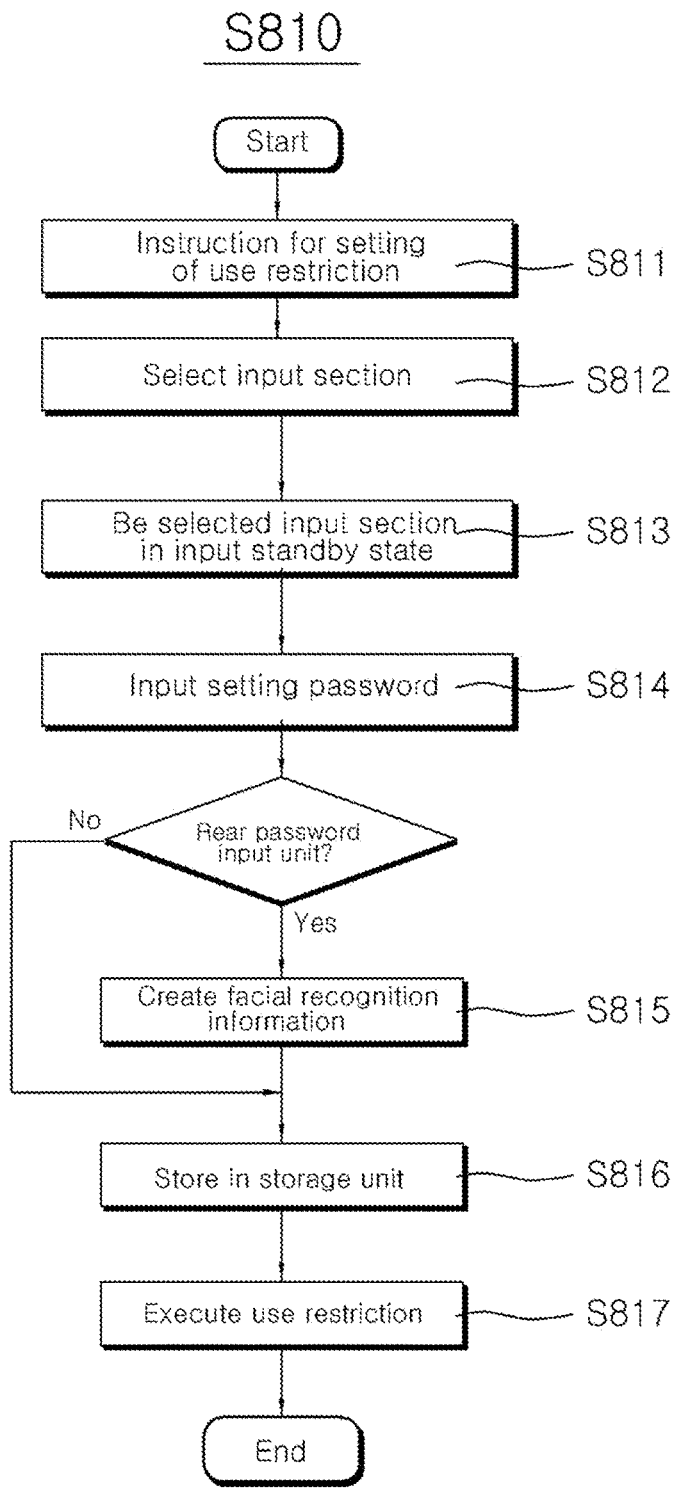
FIG. 31 is a flowchart illustrating the steps of setting the use restriction according to the seventh embodiment.
Figure 32:
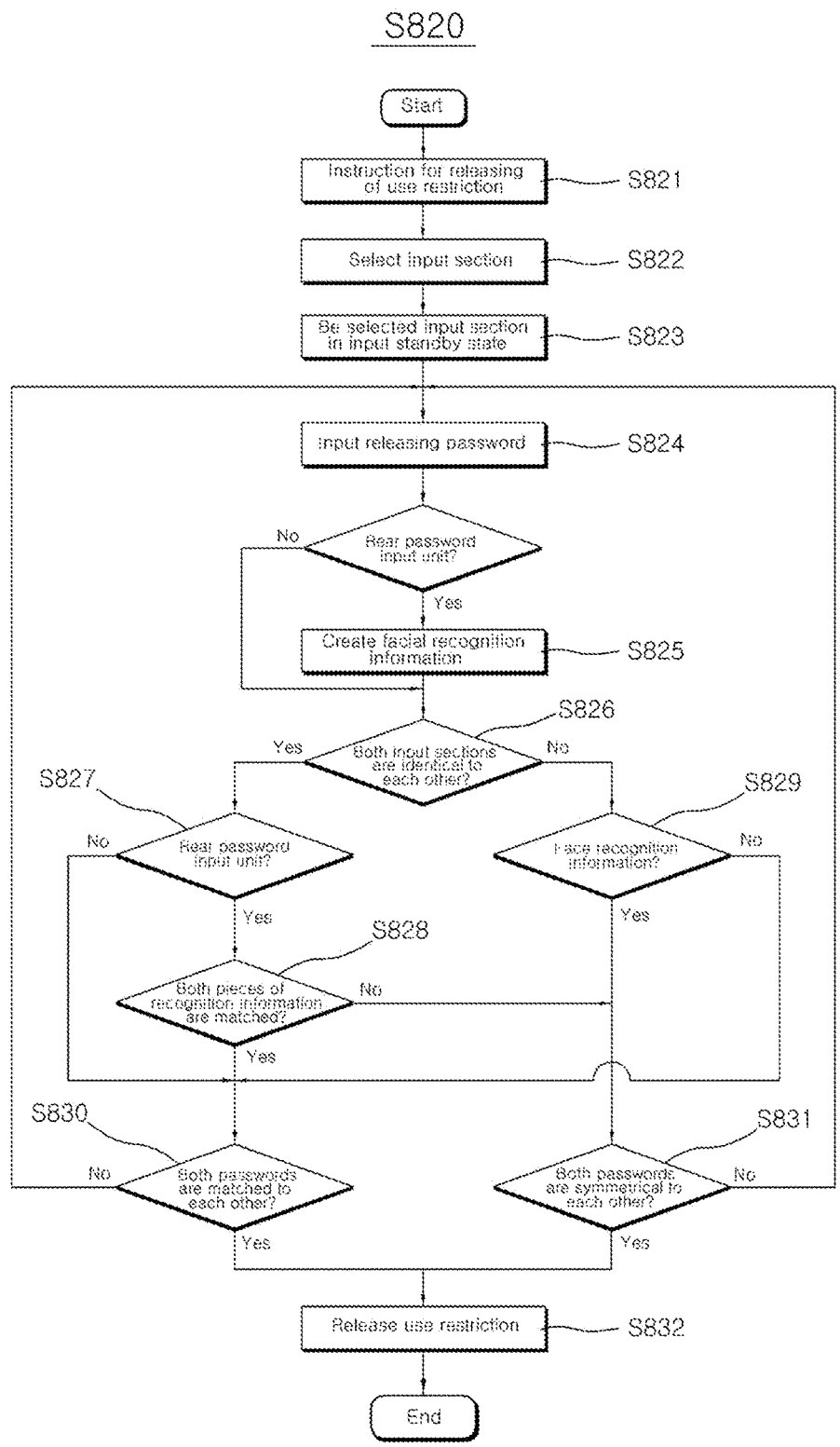
FIG. 32 is a flowchart illustrating the steps of releasing the use restriction according to the seventh embodiment.
Figure 33:
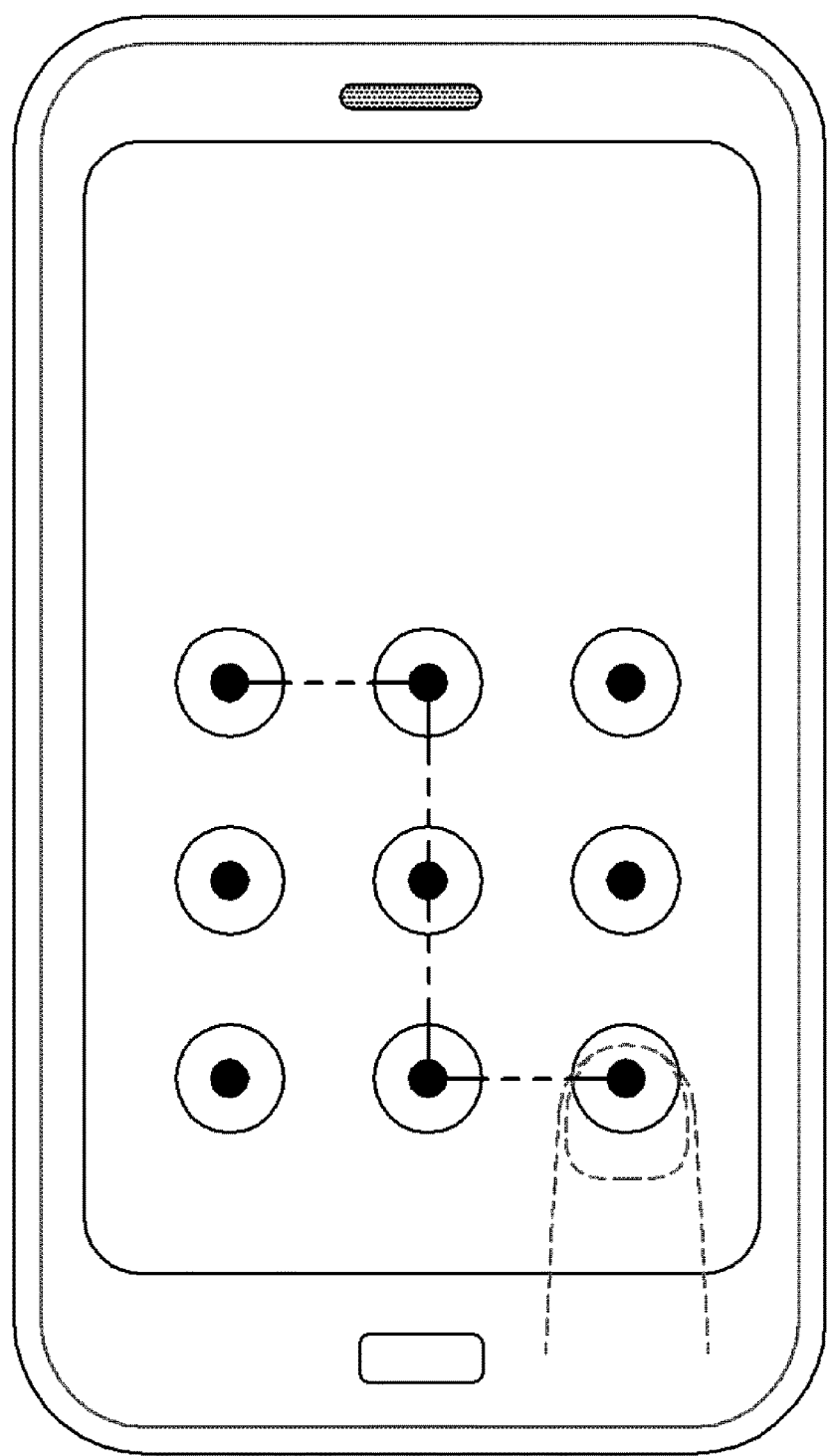
FIG. 33 is a view illustrating a method of setting and releasing the use restriction for a typical portable terminal according to the related art.

FIGS. 31 and 32 are flowcharts illustrating the method of setting and releasing the use restriction for the portable terminal according to the seventh embodiment.

First, as illustrated in FIG. 31, in a step of setting the use restriction (S810), if an instruction for the setting of the use restriction is input from the user (S811), the input section selection unit 80 receives the selection of an input section from the user after displaying the selection menu for the input section on the display unit 10 so that the user may select the display unit 10 or the rear password input unit 20 as the input section (S812).

As the input section is selected in step S812, the control unit 50 controls the display unit 10 or the rear password input unit 20 to be in the input standby state (S813), and the display unit 10 or the rear password input unit 20 selected by the user receives the setting password from the user (S814).

In addition, when the setting password is input as described above, if the rear password input unit 20 is selected as the input section in step S812, the face recognizing unit 90 creates the recognition information on the face recognition states of the user under the control of the control unit 50 (S815).

When the setting password is input as described above, the control unit 50 stores the input setting password, the selected input section (that is, the display unit 10 or the rear password input unit 20), and the recognition information (when the input section is the rear password input unit 20) created by the face recognition unit 90 together in the storage unit 40 (S816), and executes the use restriction function of the portable terminal (S817).

Next, in the step of releasing the use restriction (S820) as illustrated in FIG. 32, if the instruction for the releasing of the use restriction is input from the user (S821), the input section selection unit 80 receives from the user the selection of an input section of the releasing password after displaying the selection menu for the input section on the display unit 10 (S822).

As the input section is selected in step S822, the control unit 50 controls the display unit 10 or the rear password input unit 20 to be in the input standby state (S823), and the display unit 10 or the rear password input unit 20 selected by the user receives the releasing password from the user (S824).

Then, when the releasing password is input, if the rear password input unit 20 is selected as the input section in step S822, the face recognizing unit 90 creates the recognition information on the face recognition states of the user under the control of the control unit 50 (S825).

If the releasing password is input, the control unit 50 determines if the input section selected in the releasing of the use restriction is identical to the input section in the setting of the use restriction (S826).

In addition, if two input sections are determined as being identical to each other according to the determination result in step S826, it is determined if the two input sections, which are identical to each other, correspond to the display unit 10 or the rear password input unit 20 (S827).

Further, if the two identical sections are determined as corresponding to the rear password input unit 20 according to the determination result in step S827, it is determined if the recognition information created in the releasing of the use restriction is matched to the stored recognition information created in the setting of the use restriction (S828).

Meanwhile, if the two input sections are determined as being different from each other according to the determination result in step 826, it is determined if the recognition information created in one of cases that the setting password is input or the releasing password is input is obtained by recognizing the face (S829).

Then, it is determined if the input releasing password and the stored setting password are matched to each other (S830) based on the determinations in the above steps, in detail, on the assumption that the two input sections identical to each other are determined as corresponding to the display unit 10 according to the determination result in step S827, that the two pieces of recognition information in the releasing and the setting of the use restriction are determined as being matched to each other according to the determination result in step S828, and that the recognition information is determined as not being obtained by recognizing the face according to the determination result in step S829.

In addition, it is determined if the input releasing password is symmetrical to the stored setting password (S831) on the assumption that the two pieces of recognition information in the releasing and the setting of the use restriction are determined as being different from each other according to the determination result in step S828, and that the recognition information is determined as being obtained by recognizing the face according to the determination result in step S829.

Next, the use restriction is released (S832) if the releasing password and the setting password are determined as being matched to each other according to the determination result in step S830, or if the releasing password and the setting password are determined as being symmetrical to each other according to the determination result in step S831.

The embodiments of the present invention have been described above. As described above, according to the present invention, the password in the setting or the releasing of the use restriction is input into the rear password input unit provided on the rear surface of the body of the portable terminal. Accordingly, the rear password input unit which is an input section is hidden by the body and prevented from being exposed to other person. Further, even the password input action of the user, such as the touch action of the finger, is hidden by the body and not exposed to other persons, so that the security of the password can be remarkably enhanced. According to use environments having various probabilities of exposing the password, the input section and the input direction of the password can be freely selected according to the convenience of the user. In addition, the user can grip the portable terminal in a laying position, or in a laying position on the side of the user to use the portable terminal regardless of the input direction of the portable terminal.

The invention claimed is:

1. A portable terminal having a front surface and a rear surface, the portable terminal comprising:
   a display device provided on the front surface;
   a rear password input device provided on the rear surface to receive a setting password for setting a use restriction for the portable terminal or a releasing password for releasing the use restriction set for the portable terminal;
   an input section selection device that receives from a user selection of an input section selected from the group consisting of the display device and the rear password input device into which the setting password is to be input in setting the use restriction and the releasing password is to be input in releasing the use restriction;

an input direction selection device that receives from the user selection of whether the setting or releasing password is to be input in a forward direction that the display device faces the user or a reverse direction that the rear password input device faces the user, if the rear password input device is selected as the input section in the setting or the releasing; and a control device that stores the setting password, the selected input section, and the selected input direction in a storage device if the setting password is input into the selected input section while setting the use restriction, and that performs comparison of the input releasing password, the selected input section, and a selected input direction for the releasing with the stored setting password, the stored input section, and the stored input direction if the releasing password is input to release the use restriction, wherein the control device releases the use restriction, provided that the required conditions are satisfied, the required conditions selected from the group consisting of:

the setting and releasing input sections are identical to each other as the display device, and the setting and releasing passwords are matched to each other;

the setting and releasing input sections are identical to each other as the rear password input device; and either (i) the input directions for the setting and the releasing are identical to each other, and the setting password and the releasing password are matched to each other, or (ii) the input directions for the setting and the releasing are different from each other, and the setting and releasing passwords are symmetrical to each other; and the setting and releasing input sections are different from each other, and either (i) the input directions for the setting and the releasing are identical to each other as the reverse direction, and the setting and releasing passwords are matched to each other, or (ii) the input directions for the setting and the releasing are identical to each other as the forward direction and the setting and releasing passwords are symmetrical to each other.

2. A portable terminal having a front surface and a rear surface, the portable terminal comprising:

a display device provided on the front surface;

a rear password input device provided on the rear surface to receive a setting password for setting use restriction for the portable terminal or a releasing password for releasing the use restriction set for the portable terminal;

an input section selection device that receives from a user selection of an input section selected from the group consisting of the display device and the rear password input device into which the setting password is to be input in setting the use restriction and the releasing password is to be input in releasing the use restriction;

a face recognizing device that recognizes a face of the user to create recognition information for the setting when the setting password is input if the rear password input device is selected as the input section, and to create recognition information for the releasing when the releasing password is input if the rear password input device is selected as the input section in the releasing, respectively; and a control device that stores the setting password, the input section, and the recognition information in a storage device if the setting password is input into the selected input section while setting the use restriction, and that performs comparison of the input releasing password, the selected input section, and the created recognition information for the releasing with the stored setting password, the stored input section, and the stored recognition information if the releasing password is input to release the use restriction, wherein the control device releases the use restriction, provided that the required conditions are satisfied, the required conditions selected from the group consisting of:

the setting and releasing input sections are identical to each other as the display device, and the setting and releasing passwords are matched to each other;

the setting and releasing input sections are identical to each other as the rear password input device, and either (i) the recognition information for the setting and the recognition information for the releasing are matched to each other, and the setting and releasing passwords are matched to each other, or (ii) the recognition information for the setting and the recognition information for the releasing are different from each other, and the setting and releasing passwords are symmetrical to each other; and the setting and releasing input sections are different from each other, and either (i) the recognition information is not obtained by recognizing the face, and the setting and releasing passwords are matched to each other, or (ii) the recognition information is obtained by recognizing the face, and the setting and releasing passwords are symmetrical to each other.

3. A method of setting and releasing use restriction for a portable terminal, the method comprising:

setting the use restriction for the portable terminal including a display device provided on a front surface of a body thereof and a rear password input device provided on a rear surface of the body; and releasing the use restriction set for the portable terminal, provided that required conditions are satisfied, wherein the setting of the use restriction comprises:

receiving from a user selection of an input section selected from the group consisting of the display device and the rear password input device into which a setting password for the setting of the use restriction is to be input;

receiving from the user selection of whether the setting password is to be input in a forward direction that the display unit faces the user or a reverse direction that the rear password input unit faces the user if the rear password input unit is selected as the input section;

inputting the setting password into the selected input section; and storing the input setting password, the selected input section, and a selected input direction while setting the use restriction; and the releasing of the use restriction comprises:

receiving from the user selection of an input section selected from the group consisting of the display device and the rear password input device into which a releasing password is to be input;

receiving from the user selection of whether the releasing password is to be input in the forward direction that the display device faces the user or the reverse direction that the rear password input device faces the user, if the rear password input device is selected as the input section;

inputting the releasing password into the selected input section; and comparing the input releasing password, the selected input section, and a selected input direction for the releasing with the setting password, the input section, and the input direction, which are stored in the setting of the use restriction; and releasing the use restriction, provided that the required conditions are satisfied, the required conditions selected from the group consisting of:

the setting and releasing input sections are identical to each other as the display device, and the setting and releasing passwords are matched to each other;

the setting and releasing input sections are identical to each other as the rear password input device, and either (i) the input directions for the setting and the releasing are identical to each other, and the setting and releasing passwords are matched to each other, or (ii) the input directions for the setting and the releasing are different from each other, and the setting and releasing passwords are symmetrical to each other; and the setting and releasing input sections are different from each other, and either (i) the input directions for the setting and the releasing are the reverse directions, and the setting and releasing input passwords are matched to each other, or (ii) the input directions for the setting and the releasing are forward directions, and the input setting and releasing passwords are symmetrical to each other.

4. A method of setting and releasing use restriction for a portable terminal, the method comprising:

setting the use restriction for the portable terminal including a display device provided on a front surface of a body thereof and a rear password input device provided on a rear surface of the body; and releasing the use restriction set for the portable terminal, provided that required conditions are satisfied, wherein the setting of the use restriction comprises:

receiving from a user selection of an input section selected from the group consisting of the display device and the rear password input device into which a setting password is to be input;

inputting the setting password into the selected input section;

creating recognition information of a face of the user when the setting password is input if the rear password input device is selected as the input section; and storing the input setting password, the selected input section, and the created recognition information while setting the use restriction; and the releasing of the use restriction comprises:

receiving from the user selection of one of the input sections of the display device and the rear password input device into which a releasing password is to be input;

inputting the releasing password into said one input section;

creating recognition information of the face of the user when the releasing password is input if the rear password input device is selected as the input section;

comparing the input releasing password, the selected input section and the created recognition information for the releasing with the setting password, the input section, and the recognition information which are stored in the setting of the use restriction; and treleasing the use restriction, provided that the required conditions are satisfied, the required conditions selected from the group consisting of:

the setting and releasing input sections are identical to each other as the display device, and the setting password and the releasing password are matched to each other, the setting and releasing input sections are identical to each other as the rear password input device, and either (i) two pieces of recognition information are matched to each other, and the setting and releasing passwords are matched to each other, or (ii) the two pieces of recognition information are different from each other, and the setting and releasing passwords are symmetrical to each other; and the setting and releasing input sections are different from each other, and either (i) the recognition information is not obtained by recognizing the face, and the setting and releasing passwords are matched to each other, or (ii) the recognition information is obtained by recognizing the face, and the setting and releasing passwords are symmetrical to each other.

\* \* \* \* \*